US009511848B2

(12) United States Patent
Gerber et al.

(10) Patent No.: US 9,511,848 B2
(45) Date of Patent: Dec. 6, 2016

(54) PROFILE PLATE PORTION FOR USE AS AN OUTER WALL OF A FLOW BODY, METHOD FOR MANUFACTURING A PROFILE PLATE PORTION AND FLOW BODY COMPONENT COMPRISING A SUCTION-EXTRACTION DEVICE FOR FLUID

(71) Applicant: Airbus Operations GmbH, Hamburg (DE)

(72) Inventors: Martin Gerber, Bremen (DE); Freerk Syassen, Stadland (DE)

(73) Assignee: Airbus Operations GmbH, Hamburg (DE)

( * ) Notice: Subject to any disclaimer, the term of this patent is extended or adjusted under 35 U.S.C. 154(b) by 0 days.

(21) Appl. No.: 13/650,669

(22) Filed: Oct. 12, 2012

(65) Prior Publication Data

US 2014/0021304 A1 Jan. 23, 2014

Related U.S. Application Data

(63) Continuation of application No. PCT/EP2011/001827, filed on Apr. 12, 2011.

(30) Foreign Application Priority Data

Apr. 12, 2010 (DE) .................. 10 2010 014 639
Apr. 12, 2010 (DE) .................. 10 2010 014 640
Apr. 12, 2010 (DE) .................. 10 2010 014 641

(51) Int. Cl.
*B64C 39/00* (2006.01)
*B64C 21/02* (2006.01)
(Continued)

(52) U.S. Cl.
CPC ................ *B64C 21/02* (2013.01); *B64C 3/26* (2013.01); *B64C 21/06* (2013.01); *B64C 2230/22* (2013.01); *Y02T 50/166* (2013.01)

(58) Field of Classification Search
USPC ........................................................ 244/35 R
See application file for complete search history.

(56) References Cited

U.S. PATENT DOCUMENTS

| 2,111,530 A | 3/1938 | Seversky |
| 2,742,247 A | 4/1956 | Lachmann |

(Continued)

FOREIGN PATENT DOCUMENTS

| DE | 44 36 748 | 9/1995 |
| DE | 10 2009 022 174 | 11/2010 |

(Continued)

OTHER PUBLICATIONS

German Office Action for Application No. 10 2010 014 639.0 dated Oct. 28, 2013.

(Continued)

*Primary Examiner* — Medhat Badawi
(74) *Attorney, Agent, or Firm* — Jenkins, Wilson, Taylor & Hunt, P.A.

(57) ABSTRACT

A profile plate portion is disclosed for use as an outer wall of a flow body including a first profile plate panel that is fluid permeable, a second profile plate panel extending along the first profile plate panel, and a reinforcing device for supporting the first profile plate panel and the second profile plate panel on one another. Fluid can flow through the reinforcing device, and/or fluid of the flow present at the first profile plate panel, which flows through the first profile plate panel, can flow through the reinforcing device in the local profile plate thickness direction from the first profile plate panel to the second profile plate panel and in some regions can flow through to an inside that is situated opposite the flow side. A method is disclosed for manufacturing a profile (Continued)

plate portion and a flow body component with a suction-extraction device for fluid.

16 Claims, 23 Drawing Sheets

(51) Int. Cl.
*B64C 3/26* (2006.01)
*B64C 21/06* (2006.01)

(56) References Cited

U.S. PATENT DOCUMENTS

| | | | |
|---|---|---|---|
| 3,213,527 A | 10/1965 | Glsze | |
| 5,366,177 A * | 11/1994 | DeCoux | 244/201 |
| 5,398,410 A | 3/1995 | Yasui et al. | |
| 5,743,488 A * | 4/1998 | Rolston et al. | 244/53 B |
| 5,806,796 A | 9/1998 | Healey | |
| 5,923,003 A * | 7/1999 | Arcas et al. | 181/292 |
| 6,050,523 A * | 4/2000 | Kraenzien | 244/123.1 |
| 6,612,524 B2 | 9/2003 | Billman et al. | 244/200.1 |
| 6,622,973 B2 * | 9/2003 | Al-Garni et al. | 244/206 |
| 6,752,358 B1 * | 6/2004 | Williams et al. | 244/208 |
| 7,048,230 B2 | 5/2006 | Meyer | |
| 7,743,884 B2 * | 6/2010 | Thomas et al. | 181/292 |
| 8,091,837 B2 * | 1/2012 | Frankenberger et al. | 244/209 |
| 8,282,037 B2 * | 10/2012 | Jain | 244/53 B |
| 8,459,597 B2 * | 6/2013 | Cloft et al. | 244/208 |
| 8,596,573 B2 * | 12/2013 | Jain | 244/53 B |
| 2003/0132351 A1 * | 7/2003 | Billman et al. | 244/199 |
| 2005/0045774 A1 * | 3/2005 | Hocking | 244/209 |
| 2005/0151026 A1 * | 7/2005 | Meyer | 244/204 |
| 2008/0296439 A1 | 12/2008 | Cloft et al. | |
| 2009/0210103 A1 | 8/2009 | Cook | |
| 2009/0212165 A1 | 8/2009 | Parikh | |
| 2010/0187360 A1 * | 7/2010 | Rawlings et al. | 244/130 |
| 2010/0187361 A1 * | 7/2010 | Rawlings et al. | 244/130 |
| 2010/0294892 A1 * | 11/2010 | Syassen | 244/209 |
| 2011/0117338 A1 * | 5/2011 | Poquette et al. | 428/213 |
| 2011/0212291 A1 * | 9/2011 | Buellesbach | 428/99 |

FOREIGN PATENT DOCUMENTS

| | | |
|---|---|---|
| DE | 10 2010 014 639 | 10/2011 |
| DE | 10 2010 014 640 | 10/2011 |
| DE | 10 2010 014 641 | 10/2011 |
| GB | 718 421 | 11/1954 |
| GB | 2 324 351 | 10/1998 |
| WO | WO 92/21560 | 12/1992 |
| WO | WO 98/47761 | 10/1998 |
| WO | WO 2011/128069 | 10/2011 |

OTHER PUBLICATIONS

German Office Action for Application No. 10 2010 014 640.4 dated Oct. 22, 2013.
German Office Action for Application No. 10 2010 014 641.2 dated Oct. 23, 2013.
International Preliminary Report on Patentability for Application No. PCT/EP 2011/001827 dated Oct. 16, 2012.
Chinese Office Action for Patent Application No. 201180029971.3 dated Aug. 5, 2014.

\* cited by examiner

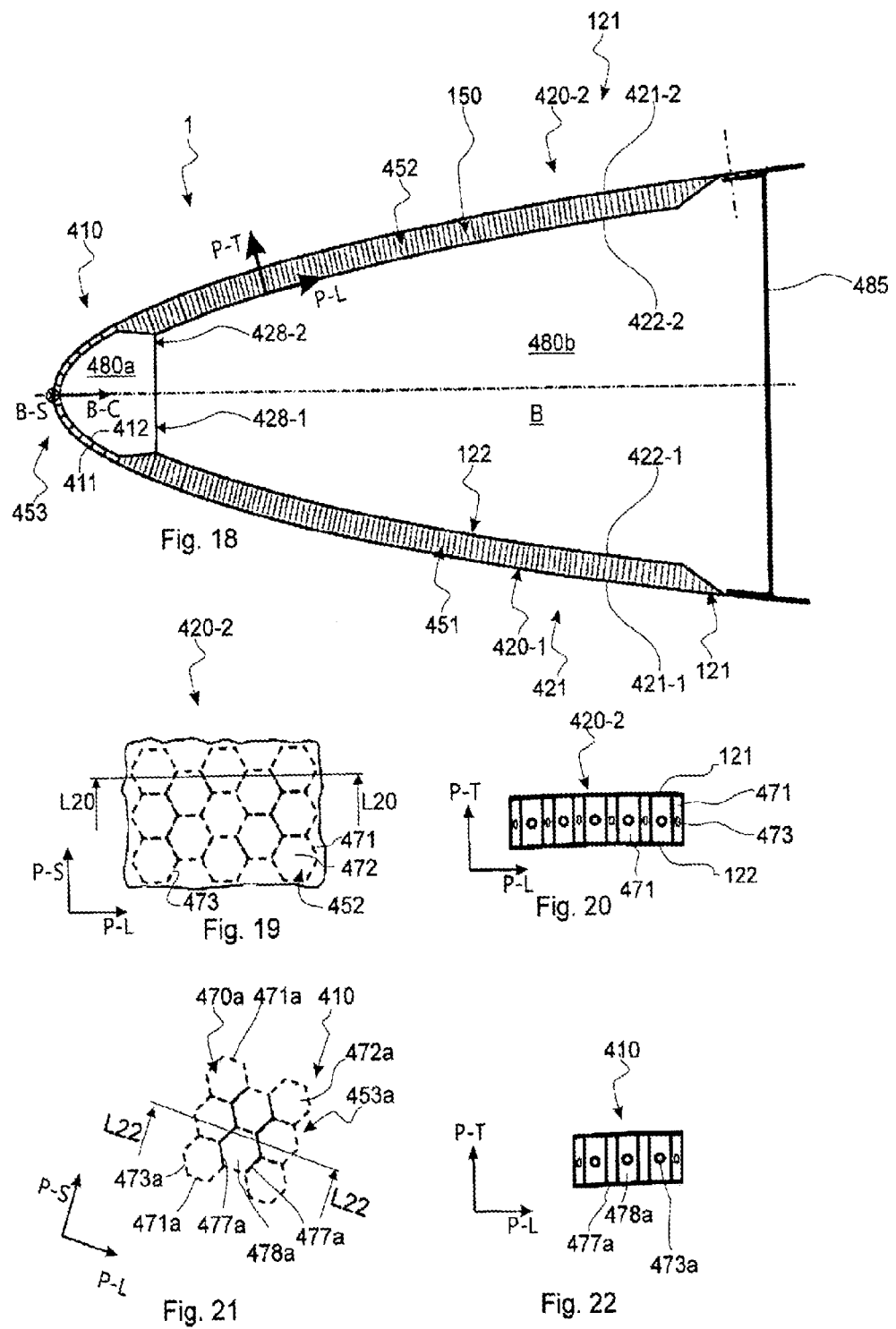

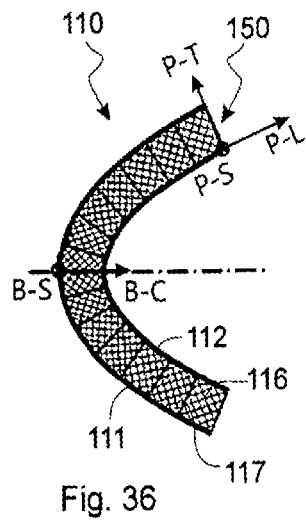
Fig. 36
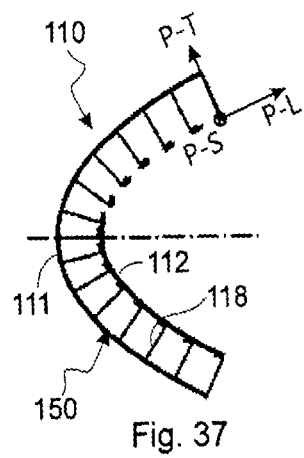
Fig. 37
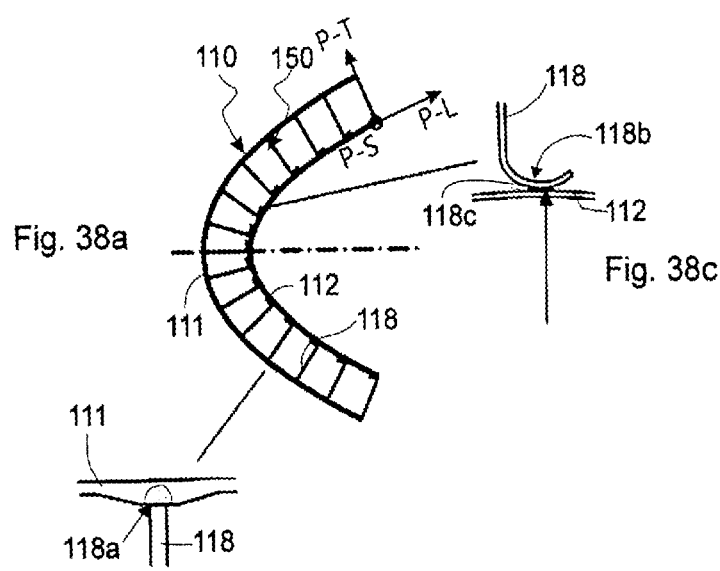
Fig. 38a
Fig. 38b
Fig. 38c

PROFILE PLATE PORTION FOR USE AS AN OUTER WALL OF A FLOW BODY, METHOD FOR MANUFACTURING A PROFILE PLATE PORTION AND FLOW BODY COMPONENT COMPRISING A SUCTION-EXTRACTION DEVICE FOR FLUID

CROSS-REFERENCE TO RELATED APPLICATIONS

This patent application is a continuation of and claims priority to PCT/EP2011/001827 filed on Apr. 12, 2011, which claims priority to German patent application DE 10 2010 014 641.2, German patent application DE 10 2010 014 640.4, and to German patent application DE 10 2010 014 639.0. The above-mentioned patent applications were filed on Apr. 12, 2010, and all of the disclosures of these patent applications are incorporated by reference herein.

TECHNICAL FIELD

The invention relates to a profile plate portion for use as an outer wall of a flow body, to a method for manufacturing a profile plate portion, and to a flow body component comprising a suction-extraction device for fluid.

BACKGROUND

From the field of aerodynamics it is known that laminar flow around wings and control surfaces provides the best possible lift with at the same time the least aerodynamic resistance against, i.e. opposite to, the direction of flow. However, because of the given profile shape it is frequently not possible to ensure such a laminar flow in all the occurring flow conditions. Even in the case of constant flow conditions, the flow can separate at discontinuous locations of the profile and can become turbulent, which results in reduced lift and increased profile drag.

As is also known from aerodynamics, by continuous suction-extraction of the turbulent layer, laminarisation of the flow can be achieved to a very considerable extent. Since at cruise flight conditions any reduction in drag at the same time is also associated with considerable fuel savings, flow laminarisation can result in considerable economic advantages being achieved. Attempts have therefore already been made to achieve such flow laminarisation by providing suction-extraction apertures in the wing. In this context it is an already known measure to provide slot-shaped suction-extraction apertures or microperforations on the surface of a wing, which suction-extraction apertures or microperforations extend in spanwise direction. If such hollow components are manufactured in a production process designated superplastic deformation, in which process they are expanded with the application of interior pressure in a negative form, perforation of the surface needs to be carried out after the deformation process because otherwise it is not possible to generate, in the component, the interior pressure required for the deformation process. However, such subsequent perforations are associated with a very considerable effort in terms of work and cost.

Furthermore, known hollow profiles are associated with a further disadvantage in that holes are required in the top cover plate, which holes are designed as perforations and are used for the suction-extraction of air for the purpose of flow laminarisation. Air is suction-extracted through these perforations with a hole size of 30 to 100 m and in this manner turbulent air is steadied. However, producing the perforations is very expensive, in particular if relatively large quantities of air and/or relatively large surfaces are involved in flow laminarisation. In known methods the perforations are made in the top cover plate by means of microperforation, for example using laser technology. Depending on the technique and the required perforation quality, perforation frequencies of 100 to 300 Hz are possible in this process. If ideal flow laminarisation in a wing, a tail unit, an engine nacelle or a control flap of a commercial aircraft is assumed as a base, normally approx. 4,000,000 holes per $m^2$ are required. At average quality this results in a production time of 4.45 hours for 4 million holes, and thus of approx. 4½ hours per square meter. Thus, producing the necessary perforations for both horizontal tail units of a commercial aircraft, with each unit measuring 7 $m^2$, takes up a period of more than two days.

The use of known methods for producing the required perforations is associated with a further disadvantage in that, as a result of the laser technique, ridges arise at the holes, and/or surface impairments arise. With such surface impairments or ridges there is a danger of air turbulence arising and thus negatively influencing the flow. In other words, the flow becomes more turbulent again as a result of the ridges or surface impairments. The production technique would thus counteract the very objective of flow laminarisation, and would at least in part cancel it. If one is not prepared to accept this disadvantage, after completion of the perforations a further, very expensive, production step of deburring, for example by chemical etching, must follow.

SUMMARY

It is the object of the present invention to overcome the above-described disadvantages of known methods.

The above-mentioned object is met by the characteristics of the independent claims. Further embodiments are stated in the related subordinate claims.

According to one aspect of the invention, a profile plate portion for use as an outer wall of a flow body is provided, wherein the profile plate portion comprises:
  at least in some sections a first profile plate panel against which during intended use of the profile plate portion a flow is present, wherein the first profile plate panel is permeable to fluid in such a manner that in some sections fluid can flow through said profile plate panel,
  a second profile plate panel, which at least in some sections extends along the first profile plate panel and is spaced apart from the aforesaid in a local profile plate thickness direction,
  a reinforcing device for supporting the first profile plate panel and the second profile plate panel on one another, wherein the reinforcing device is designed in such a manner that fluid of the flow present at the first profile plate panel, which fluid flows through the first profile plate panel, can flow along the longitudinal direction of the panel through the reinforcing device and between the first profile plate panel and the second profile plate panel,
  and/or
  wherein the second profile plate panel is designed in such a manner that fluid of the flow present at the first profile plate panel, which fluid flows through the first profile plate panel, can flow through the reinforcing device in the local profile plate thickness direction from the first profile plate panel to the second profile plate panel, and in some regions can flow to an inside that is situated opposite the flow side.

According to one embodiment of the profile plate portion according to the invention, it is provided that the reinforcing device is formed from an open-pore metal foam layer that extends between the first profile plate panel and the second profile plate panel.

According to one embodiment of the profile plate portion according to the invention, it is provided that supporting carriers extend in a spanwise direction of the profile plate portion, which supporting carriers are attached to the first profile plate panel and to the second profile plate panel, so that at least in some of the spaces which in each case form between two adjacent supporting carriers at least one open-pore metal foam layer body is received in such a manner that fluid flowing through the first profile plate panel flows through the open-pore metal foam layer body.

According to one embodiment of the profile plate portion according to the invention, it is provided that the open-pore metal foam layer bodies rest flat against the respective supporting carriers, between which in each case a metal foam layer body is situated.

According to one embodiment of the profile plate portion according to the invention, it is provided that the open-pore metal foam layer on the side of the second profile plate panel comprises recesses that open towards the second profile plate panel and in each case merge with apertures of the second profile plate panel.

According to one embodiment of the profile plate portion according to the invention, it is provided that the recesses are at least in part spherical in shape when viewed in profile section.

According to one embodiment of the profile plate portion according to the invention, it is provided that for the purpose of supporting the porous metal foam core the recesses comprise a fluid-permeable reinforcement layer.

According to one embodiment of the profile plate portion according to the invention, it is provided that the reinforcing device comprises supporting stays or reinforcing stays that are connected to the first profile plate panel and the second profile plate panel, which supporting stays or reinforcing stays mutually support the hollow chamber profile in its profile plate thickness direction, and which supporting stays or reinforcing stays delimit fluid chambers through which the fluid flowing through the first profile plate panel can flow to the second profile plate panel.

According to one embodiment of the profile plate portion according to the invention, it is provided that at least in some sections supporting stays extend across a longitudinal direction of the profile plate portion along each other, which supporting stays in a cross-sectional plane that extends along the longitudinal extension of the profile plate portion are curved or are formed from wall sections that extend at an angle to each other and that adjoin each other.

According to one embodiment of the profile plate portion according to the invention, it is provided that the supporting stays are wall sections that form profile plate chambers that are formed between the aforesaid and the first profile plate panel and the second profile plate panel.

According to one embodiment of the profile plate portion according to the invention, it is provided that the first profile plate panel comprises microperforations whose distribution density and/or size in each case increase/increases in the region within a profile plate chamber in a longitudinal direction of the profile plate portion.

According to one embodiment of the profile plate portion according to the invention, it is provided that the wall sections in a cross-sectional plane that extends along the longitudinal extension of the profile plate portion form a polygonal and in particular honeycomb-shaped cross-sectional area of the profile plate chambers.

In this arrangement the cross-sectional profiles of the reinforcing stays, which cross-sectional profiles result in the plane defined in particular in the thickness direction and in the longitudinal direction, can form a framework structure.

In the embodiment of the profile plate portion according to the invention with reinforcing stays it can be provided that at least some of the supporting stays or reinforcing stays comprise apertures so that fluid can flow between the fluid chambers delimited by the reinforcing stays.

According to one embodiment of the profile plate portion according to the invention, it is provided that the first profile plate panel comprises a mesh arrangement and in particular a metal mesh arrangement.

According to one embodiment of the profile plate portion according to the invention, it is provided that the first profile plate panel comprises apertures in the form of perforations that are distributed in the profile plate longitudinal direction and in the profile plate cross direction over the distance of the first profile plate panel.

According to one embodiment of the profile plate portion according to the invention, it is provided that the first profile plate panel comprises apertures, in particular in the form of slits, that are distributed in the profile plate longitudinal direction and in the profile plate cross direction over the distance of the first profile plate panel.

According to one embodiment of the profile plate portion according to the invention, it is provided that within the region the size of the apertures of at least some of the fluid chambers increases in the direction of the profile plate longitudinal direction.

According to a further aspect of the invention, a method for manufacturing a profile plate portion for use as an outer wall of a flow body is provided, with the aforesaid comprising a first profile plate panel and a second profile plate panel and stay plates that mutually support them, wherein at least the first profile plate panel is designed so as to be permeable to fluid, wherein by means of the application of interior pressure and temperature the profile plate portion, from an initial state in which the first profile plate panel, the second profile plate panel and between these the reinforcing stays lie flat against each other, between two tool components that are moved apart as a result of the application of interior pressure, is expanded to its final form, and wherein the second tool component, which rests against the first profile plate panel, comprises an air exhaust device by means of which at the interior pressure built up to expand the space between the profile plate panels and the tool components in the tool, greater air throughput during air exhaustion through the second tool component from the region between the two tool components is provided when compared to the air throughput of the air flowing through the first profile plate panel.

According to one embodiment of the method according to the invention, it is provided that, by means of diffusion welding, connecting border regions of reinforcing stays takes place, while the reinforcing stays rest flat between a first profile plate panel and a second profile plate panel.

According to one embodiment of the method according to the invention, it is provided that the first sidewall profile plate panel comprises a mesh arrangement in particular comprising metal.

According to one embodiment of the method according to the invention, it is provided that the first sidewall profile plate panel is a perforated plate.

According to one embodiment of the method according to the invention, it is provided that the reinforcing stays are formed in a single component.

According to one embodiment of the method according to the invention, it is provided that the reinforcing stays comprise two components, in each case two stay components, wherein the stay components are welded together in each case at adjoining border regions.

According to a further aspect of the invention, a flow body component is provided, comprising:
- a front profile plate portion that is permeable to fluid,
- two sidewall profile plate portions which in each case extend from the profile ends of the front of the flow body in the chord direction of the flow body, which sidewall profile plate portions are curved in opposite directions to each other, wherein the sidewall profile plate portions at least in some sections are formed so as to be permeable to fluid, or wherein an outer profile plate panel of the sidewall profile plate portions (120) is formed so as to be permeable to fluid, and an inner profile plate panel of the sidewall profile plate portions with an inner layer is formed so as to be impermeable to fluid, and the sidewall profile plate portions are designed in such a manner that as a result of the incident flow of the flow body component, fluid that has entered into the sidewall profile plate portions can flow within the respective sidewall profile plate portion and along it.

According to one embodiment of the flow body component according to the invention, it is provided that the sidewall profile plate portions are designed according to one embodiment of the invention.

According to one embodiment of the flow body component according to the invention, it is provided that the flow body component comprises a suction-extraction device for fluid, which suction-extraction device comprises a flow channel formed in the interior of the flow body, which flow channel in some sections is delimited by the second fluid-permeable front panel, and comprises a pump, connected to the flow channel, for suction-extraction, through the flow channel, of fluid flowing through the front of the flow body.

According to one embodiment of the flow body component according to the invention, it is provided that the flow body component comprises a flow channel, formed in the interior of the flow body, with an opening into the interior of the flow body component and/or an outlet from the interior of the flow body component, wherein said flow channel is guided in the flow body component in such a manner that, during incident flow of the flow body component as intended, suction-extraction of the fluid flowing through the front of the flow body takes place through the flow channel.

According to one embodiment of the flow body component according to the invention, it is provided that the front profile plate portion comprises a first fluid-permeable front profile plate panel, which is permeable to fluid, a second fluid-permeable front profile plate panel, which is permeable to fluid, and a front reinforcing device for supporting the front profile plate panels so that fluid can flow through the front profile plate portion.

According to one embodiment of the flow body component according to the invention, it is provided
that the second sidewall profile plate panel is designed so as to be permeable to fluid,
that the flow body comprises a channel wall that extends in the longitudinal direction of the flow body, which channel wall is connected in an airtight manner to connection sections of two opposite border regions of the profile plate portions, or which channel wall is connected in an airtight manner to the opposite end sections of the profile plate portions that are situated opposite the connecting sections of the profile plate portions at the respective end of the front of the flow body so that the flow channel is formed between the front of the flow body, the profile plate portions and the channel wall.

According to one embodiment of the flow body component according to the invention, it is provided
that the flow body comprises a channel wall that extends in the longitudinal direction of the flow body, which channel wall is connected in an airtight manner to the end sections of the profile plate portions lying opposite to each other, with the end sections being situated at the connecting sections of profile plate portions at the respective end of the front of the flow body so that the flow channel is formed between the front of the flow body, the profile plate portions and the channel wall,
that the second sidewall profile plate panel is designed so as to be fluid-tight,
that the reinforcing device is designed in such a manner that it allows a flow in the interior region situated between the first sidewall profile plate panel and the second sidewall profile plate panel,
that the interior between the first sidewall profile plate panel and the second sidewall profile plate panel is aerodynamically connected to the flow channel so that the fluid flowing through the first sidewall profile plate panel is suction-extracted, by the pump, through the flow channel.

According to one embodiment of the flow body component according to the invention, it is provided
that the flow body comprises a channel wall that extends in the longitudinal direction of the flow body, which channel wall is connected in an airtight manner with the opposite end sections of the profile plate portions that are situated at the connecting sections of the profile plate portions at the respective end of the front of the flow body so that the flow channel is formed between the front of the flow body, the profile plate portions and the channel wall,
that the second sidewall profile plate panel is designed so as to be permeable to fluid,
that on the second sidewall profile plate panel of both profile plate portions in each case a collection channel wall extends along the profile plate portions in order to form a collection channel between the respective sidewall profile plate panel and the collection channel wall, wherein each collection channel comprises an outlet to the main flow channel so that the fluid flowing through the first sidewall profile plate panels flows into the main flow channel.

According to one embodiment of the flow body component according to the invention, it is provided that the front of the flow body comprises metal foam bodies that are situated side by side along the longitudinal extension of the front of the flow body.

According to one embodiment of the flow body component according to the invention, it is provided that the first front panel at least in some sections comprises a metal mesh arrangement.

According to a further aspect of the invention, a flow body with a flow body component is provided which, when viewed against, i.e. opposite to, its chord direction, is arranged in a front region of the flow body and is designed according to one embodiment according to the invention, wherein the flow body component extends up to 15% to 20% of the entire profile depth of the flow body from the front end of said flow body, and wherein the front profile plate portion of the flow body component extends up to 3% to 8% of the entire profile depth of the flow body from the front end of said flow body.

According to a further aspect of the invention, a method for manufacturing a profile plate portion is provided with a first profile plate panel that provides a flow surface, a second profile plate panel and a front reinforcing device that mutually supports said flow surface in a support direction, which front reinforcing device comprises several reinforcing stays that are arranged side by side in the longitudinal direction of the profile plate and that extends in the lateral direction of the profile plate, wherein at least some of the reinforcing stays comprise a cross-sectional profile with a straight-line end section that forms the main stay section on the first profile end, and a curved end section on the second cross-sectional profile end, which is situated opposite the first cross-sectional profile end, wherein the curved end section is designed as a base that comprises a supporting surface at the underside of the base, wherein the method comprises the following steps:
  connecting the first profile plate panel to the first profile ends of a multitude of reinforcing stays,
  connecting the second profile plate panel to the bases of the reinforcing stays.

In this arrangement, the method can, in particular, provide that connecting the second profile plate panel to the bases of the reinforcing stays takes place by:
  placing the second profile plate panel onto the supporting surfaces of the bases of the reinforcing stays, which supporting surfaces are situated on the underside of the bases,
  welding, by means of laser beam welding technology, the bases of the reinforcing stays from that side that is situated outside the profile plate portion and on the second profile plate panel, as an alternative to the above, the method can, in particular, provide that connecting the second profile plate panel to the bases of the reinforcing stays takes place by:
  applying a soldering agent onto the underside of the bases of the reinforcing stays,
  placing the second profile plate panel onto the supporting surfaces of the bases of the reinforcing stays, which supporting surfaces are situated on the underside of the bases,
  soldering, by means of soldering technology, the bases of the reinforcing stays from that side that is situated outside the profile plate portion and on the second profile plate panel.

BRIEF DESCRIPTION OF THE DRAWINGS

Below, the invention is described with reference to the enclosed figures that show the following:

FIG. 40b a cross section of a second step of the embodiment of a method according to the invention according to FIG. 40a;

Possible applications of the profile plate portion, provided according to the invention, as an outer wall of a flow body or of a flow body component, optionally comprising a suction-extraction device for fluid, are, in particular, described with reference to FIGS. 1, 2a, 2b, 2c.

DETAILED DESCRIPTION

Figure 1:
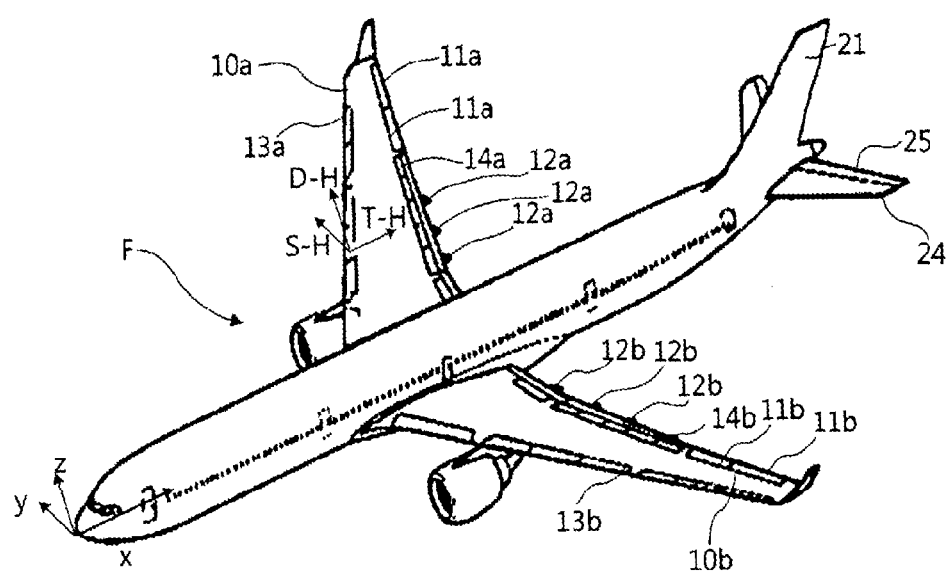
FIG. 1 a perspective view of an aircraft with flow bodies, to which aircraft the invention can be applied, FIG. 2a a perspective view of the vertical stabiliser of the aircraft shown in FIG. 1, which aircraft comprises a basic vertical stabiliser body and a vertical stabiliser leading edge body, wherein according to one embodiment of the invention the vertical stabiliser leading edge body is designed as a flow body according to the invention, FIG. 2b a lateral view of the vertical stabiliser according to FIG. 2a, FIG. 2c a disaggregated component view of the vertical stabiliser according to FIG. 2a, FIG. 3 a front view of the vertical stabiliser according to FIG. 2a, FIG. 4 a section along line A-A shown in FIG. 3 of the vertical stabiliser according to FIG. 2a, FIG. 5 a section along line B-B shown in FIG. 3 of the vertical stabiliser according to FIG. 2a, FIG. 6 a section along line C-C shown in FIG. 3 of the vertical stabiliser according to FIG. 2a, FIG. 7 a section view of the cross section of one embodiment according to the invention of a flow body component, implemented as a leading edge body, with a front profile plate portion and sidewall profile plate portions adjoining laterally to the aforesaid, which sidewall profile plate portions in each case comprise an outer or first and an inner or second profile plate panel, wherein the front profile plate portion and the sidewall profile plate portions comprise an intermediate layer of metal foam, FIG. 8 a section of a first embodiment of a sidewall profile plate portion with a foam core intermediate layer, wherein the inner or second profile plate panel comprises an aperture for letting through fluid that flows through the sidewall profile plate portion, FIG. 9 a section of a second embodiment of a sidewall profile plate portion, in which, when compared to the embodiment shown in FIG. 8, the foam core intermediate layer comprises a recess of a first form, FIG. 10 a section of a third embodiment of a sidewall profile plate portion, in which, when compared to the embodiment shown in FIG. 9, the inward facing surface of sidewall profile plate portion comprises a layer, FIG. 11 a section of a fourth embodiment of a sidewall profile plate portion in which, when compared to the embodiment shown in FIG. 9, the foam core intermediate layer comprises a recess of a second form, FIG. 12 the interior profile plate panel of one embodiment of a sidewall profile plate portion, shown in a view from the inside of the flow body component, and a surface region of the interior profile plate panel, which surface region is visible from the interior B, with apertures arranged in said profile plate panel, and with an arrangement of recesses shown in dashed lines, FIG. 13 a perspective view of a mesh layer from which the first or the second profile plate panel of a profile plate portion can be formed with an intermediate layer, FIG. 14 a cross-sectional view of one embodiment of a profile plate panel as a mesh arrangement with several mesh layers in each case according to FIG. 13, FIG. 15 a cross-sectional view of a further embodiment of the flow body component according to the invention, FIG. 16 a perspective view of one embodiment of a profile plate portion according to the invention, which embodiment can, in particular, be used for a front profile plate portion and/or a laterally adjacent sidewall profile plate portion of the flow body component according to FIG. 15, FIG. 17 a perspective view of a further embodiment of a profile plate portion according to the invention, which embodiment can, in particular, be used for a front profile plate portion and/or a laterally adjacent sidewall profile plate portion of the flow body component according to FIG. 15, FIG. 18 a cross-sectional view of a further embodiment of the flow body component according to the invention, FIG. 19 a top view of a cross section of a section, designed as a honeycomb structure, of the reinforcing device of the sidewall profile plate portion of the flow body component according to FIG. 15 in the plane defined by the longitudinal direction and the spanwise direction of said sidewall profile plate portion, FIG. 20 a cross section of the honeycomb structure according to FIG. 19 along the section lines L20 entered thereon, in the plane defined by the longitudinal direction and the thickness direction of the sidewall profile plate portion of the flow body component according to FIG. 15, FIG. 21 a top view of a section of the reinforcing device, designed as a honeycomb structure, of the front profile plate portion of the flow body component according to FIG. 15 in the plane thereof defined by the longitudinal direction and spanwise direction, wherein a cross section of the honeycomb structure according to FIG. 21 along the section lines L20 entered thereon is shown in FIG. 20, FIG. 22 a cross section of the honeycomb structure according to FIG. 21 along the section lines L22 entered thereon in the plane of the sidewall profile plate portion of the flow body component according to FIG. 15, which plane is defined by the longitudinal direction and the thickness direction, FIG. 23 a diagrammatic top view of a cross section of a section of the profile plate portion, designed as a honeycomb structure, according to the invention in the plane thereof, which plane is defined by the longitudinal direction and the spanwise direction, FIG. 24 a diagrammatic cross section of the honeycomb structure according to FIG. 23, designed as a reinforcing device of a profile plate portion, along the section lines L23 entered thereon, in the plane of the profile plate portion, which plane is defined by the longitudinal direction and the thickness direction.

FIG. 1 shows an aircraft F, provided for the application of embodiments of the invention, with two aerofoils 10a, 10b. In FIG. 1 an aircraft-coordinate system, related to the aircraft F, has been entered with an aircraft longitudinal axis X, an aircraft transverse axis Y and an aircraft vertical axis Z. The aerofoils 10a, 10b provided for the application of the invention each comprises a main wing and

- at least one aileron 11a or 11b arranged thereon so as to be movable in two directions of movement,
- optionally at least one spoiler 12a or 12b movably arranged thereon,
- optionally at least one leading edge high-lift body 13a, 13b arranged on the main wing so as to be movable between a retracted and an extended position, for example a slat or a leading edge flap and
- at least one optional trailing edge flap 14a, 14b.

For the sake of providing clarity of illustration, in FIG. 1 only some of the spoilers 12a or 12b, slats 13a, 13b and/or trailing edge flaps 14a, 14b comprise a reference character.

Furthermore, the aircraft F shown in FIG. 1 comprises a vertical stabiliser 20 with at least one rudder 21. Optionally, the aircraft F can also comprise a horizontal tail unit 24 in each case with at least one elevator 25. The horizontal tail unit 24 can also be designed as a T-tail or a cruciform tail. The invention can also be applied to the vertical stabiliser 20 and/or to the horizontal tail unit 24.

The aircraft F according to the invention, which is provided for the application of the invention, can also comprise a form other than the form of the aircraft F shown in FIG. 1, so that the invention can also be used with aircraft control surfaces, for example aerofoils and/or tail units, that are of a different design when compared to that shown in FIG. 1, for example to aerofoils, auxiliary wings, canards or tail units of a high-wing aircraft or of a blended wing body aircraft.

The following coordinate systems have been introduced to describe the invention:

the coordinate system of the main wing as a local coordinate system with a main wing spanwise direction S-H, a main wing chord direction T-H and a main wing thickness direction D-H in each case of the main wing, wherein the origin of the local coordinate system of the main wing is situated at the respectively to be selected position on the leading edge, in other words on the frontmost line of the main wing H when viewed against, i.e. opposite to, the X-axis, and wherein the coordinate system of the main wing is oriented in such a manner that the main wing spanwise direction S-H extends in the direction of the aircraft transverse axis Y, and the main wing thickness direction D-H extends in the direction of the aircraft vertical axis Z, the coordinate system of the vertical stabiliser L as a local coordinate system with a vertical stabiliser spanwise direction S-L, a vertical stabiliser chord direction T-L and a vertical stabiliser thickness direction D-L, in each case of the vertical stabiliser L, wherein the origin of the local coordinate system of the vertical stabiliser L is situated at the respectively to be selected position on the leading edge, in other words on the frontmost line of the vertical stabiliser L when viewed against, i.e. opposite to, the X-axis, and wherein the coordinate system of the vertical stabiliser L is oriented in such a manner that the vertical stabiliser spanwise direction S-I extends in the direction of the aircraft vertical axis Z, and the vertical stabiliser thickness direction D-L extends in the direction of the aircraft transverse axis Y, the coordinate system of the horizontal tail unit HS as a local coordinate system with a horizontal tail unit spanwise direction S-HS, a horizontal tail unit chord direction T-HS and a horizontal tail unit-thickness direction D-HS, in each case of the horizontal tail unit HS, wherein the origin of the local coordinate system of the horizontal tail unit HS is situated at the respectively to be selected position on the leading edge, in other words on the frontmost line of the horizontal tail unit HS when viewed against, i.e. opposite to, the X-axis, and wherein the coordinate system of the main wing H is oriented in such a manner that the main wing spanwise direction S-H extends in the direction of the aircraft transverse axis Y, and the main wing thickness direction D-H extends in the direction of the aircraft vertical axis Z.

In this context, the term "above, or top" starting from the aerofoil refers to the direction that points away from the top of the aerofoil, or the positive Z-direction of the aircraft-coordinate system or the positive wing thickness direction of the aerofoil coordinate system.

The profile plate portion according to the invention and the flow body component according to the invention can in each case also be used in relation to vehicles other than aircraft, for example to water craft, for example ships, or to land craft, for example cars. In this context the profile plate portion can, in particular, form part of the outer wall or of the flow body component of the respective water craft or land craft, and can form a sidewall of the aforesaid when viewed in the chord direction of the respective flow body component. In this arrangement the chord direction of the local flow body coordinate system extends along the longitudinal axis or the nominal incident flow direction or the X-axis of the respective water craft or land craft, and the spanwise direction or cross direction extends in the direction of the longitudinal extension of the outer wall or of the flow body component.

In relation to the profile plate portion 100 according to the invention, said profile plate portion 100 comprises a flow side A which during operation is subject to a flow, and an inside B which is situated against, i.e. opposite to, the flow side and facing the interior of the flow body component.

The flow body component 1 according to the invention can, in particular, be a wing, and in particular a main wing, a high-lift flap such as a leading edge flap or a trailing edge flap, a rudder, a control flap, a tail unit such as, in particular, a vertical stabiliser or a horizontal tail unit or part thereof. Moreover, the flow body component 1 according to the invention can be a front part of a wing, and in particular of a main wing, of a high-lift flap such as a leading edge flap or a trailing edge flap, of a rudder, of a control flap, of a tail unit, in particular of a vertical stabiliser or of a horizontal tail unit or of part thereof. The flow body component 1 according to the invention can, in particular, comprise:

- a front profile plate portion 110 that is permeable to fluid,
- two sidewall profile plate portions 120, which in each case extend from the profile ends of the front of the flow body 110 in the direction of the flow body chord direction B-C, wherein each of the sidewall profile plate portions 120 can, in particular, be designed according to one embodiment of the aforesaid.

When viewed against, i.e. opposite to, the direction of the flow that is present as intended on the flow body, or when viewed against, i.e. opposite to, the chord direction of the flow body, the flow body component 1 as the front part of a respective flow body is situated in front of a base body of the flow body and is affixed to the aforesaid. The flow body component 1 extends at least in some sections along the span of the respective flow body and comprises a convex shape that is fluid-dynamically efficient in terms of a front part of the respective flow body. When viewed in the direction of flow, the sidewall profile plate portions 120 of the flow body component 1 adjoin the aforesaid downstream of the front profile plate portion 110.

According to the invention the front profile plate portion 110 is designed in such a manner that the flow body component 1 is a curved plate, and at the latter comprises connecting devices (only diagrammatically indicated in FIG. 7) that in each case can be formed on the rear ends of the sidewall profile plate portions 120, in particular from a plate-shaped end piece, for connection to a base body and for example holes or recesses to accommodate connection means for connecting the respective sidewall profile plate portion 120 to the base body of the flow body. According to the invention the front profile plate portion 110 is designed so as to be permeable to fluid. The sidewall profile plate portions 120 can at least in some sections in the entire thickness direction be designed so as to be permeable to fluid, or it can be provided that only an outer layer, in particular a first or outer profile plate panel 121, 122 is designed so as to be permeable to fluid. In the latter case the sidewall profile plate portions 120 are designed in such a manner that in an inner layer they are not permeable to fluid, but are designed in such a manner that the fluid that has entered the sidewall profile plate portions 120 as a result of the incident flow against the flow body component 1 can flow within the respective sidewall profile plate portion 120 and along it. In this arrangement an outlet is provided at a front end section of the sidewall profile plate portion 120 so that the fluid can be fed from a flow channel situated in the region of the front profile plate portion 110 or from the front profile plate portion 110. In this manner, predetermined suction-extraction, which in one exemplary embodiment is also controlled or regulated, of fluid, and in particular of air, through the flow body component 1 is possible.

According to the invention, furthermore, a profile plate portion 120 is provided, which can, in particular, be used as a sidewall profile plate panel 121, 122 of a flow body component 1 according to the invention. The profile plate portion 120 according to the invention with the first and the second profile plate panel 121, 122 can, however, generally speaking also be used as an outer wall for different flow body components 1, which outer wall at least in some sections shall make possible a through-flow of fluid over an area-like section of the outer wall or of the profile plate portion 120 and thus through the sidewall profile plate panels 121, 122, or which outer wall at least in some sections through-flow of fluid only through an outer layer or the first or outer sidewall profile plate panel 121, 122 is to be made possible, in particular with the possibility of conveying fluid between and along the sidewall profile plate panels 121, 122.

The flow body component 1 according to the invention can be used as a leading edge body 23 of a vertical stabiliser L, as shown in FIGS. 2a to 6, or of a main wing H. or can be a control flap, and in particular of a high-lift flap, such as of a leading edge high-lift body or of a trailing edge high-lift body. The outside contour of the cross-sectional profile of a leading edge body 23, which cross-sectional profile is arranged on a main wing H or on a control flap and in particular on a high-lift flap, when viewed from the thickness direction and from the chord direction of the respective flow body, depending on the application can be symmetrical in shape, such as in the case of a vertical stabiliser, or it can be asymmetrical in shape.

Analogously, a flow body component 1 or a leading edge body 23 according to the invention can also be arranged on a flow body of a water craft or land craft, and in this arrangement can, for example, be arranged on a rudder or a spoiler.

Figure 2A:
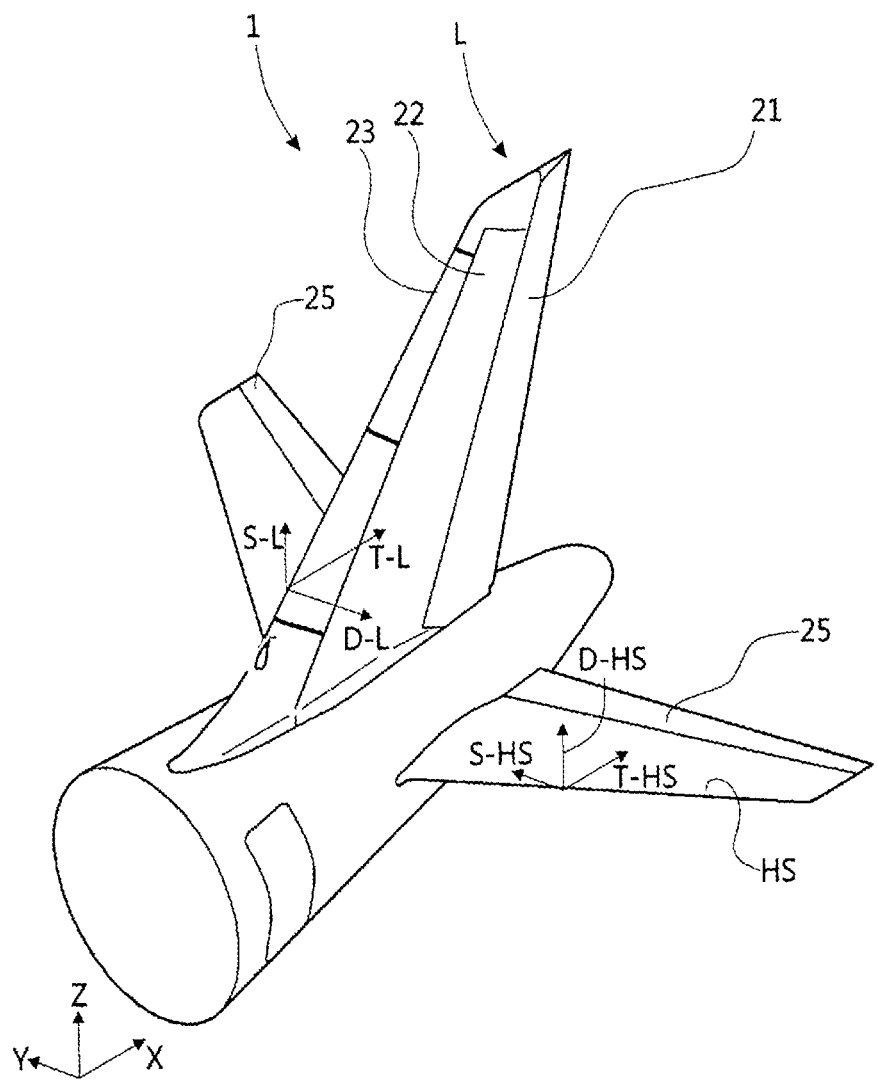
Figure 2B:
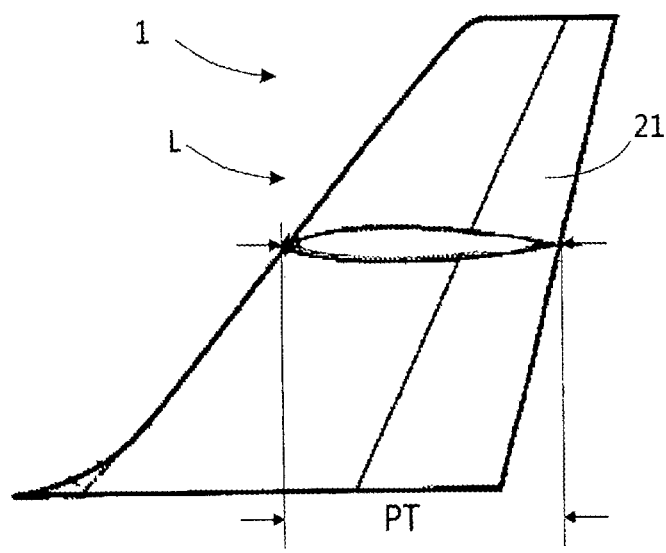
Figure 2C:
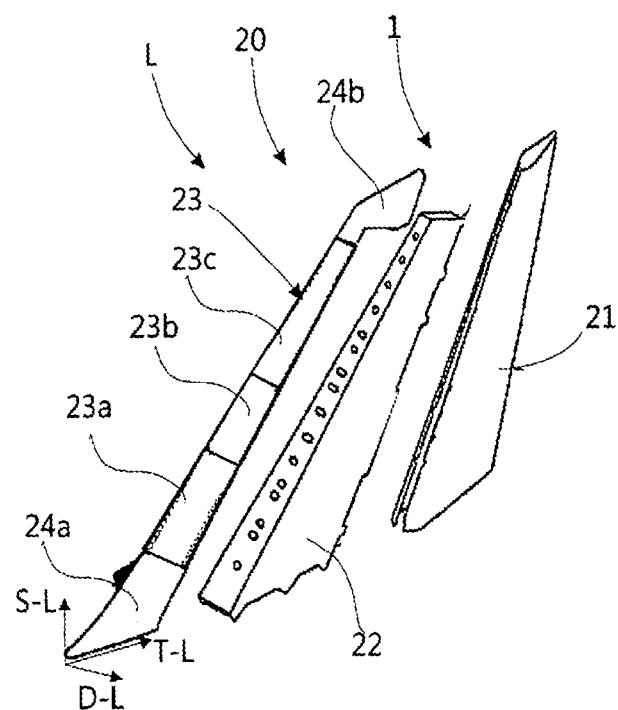
Figure 3:
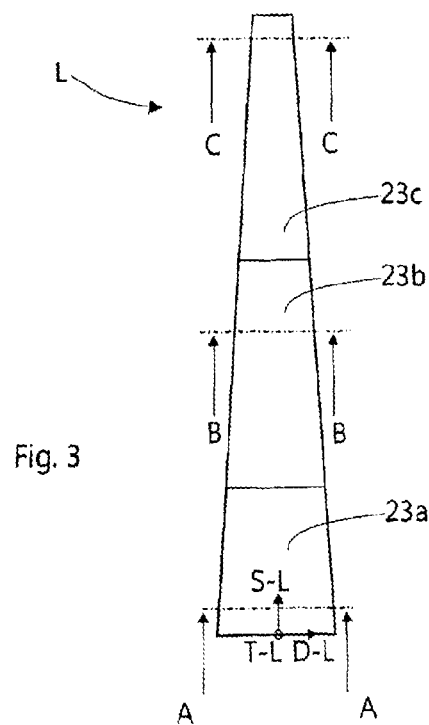
Figures 4, 5, 6:
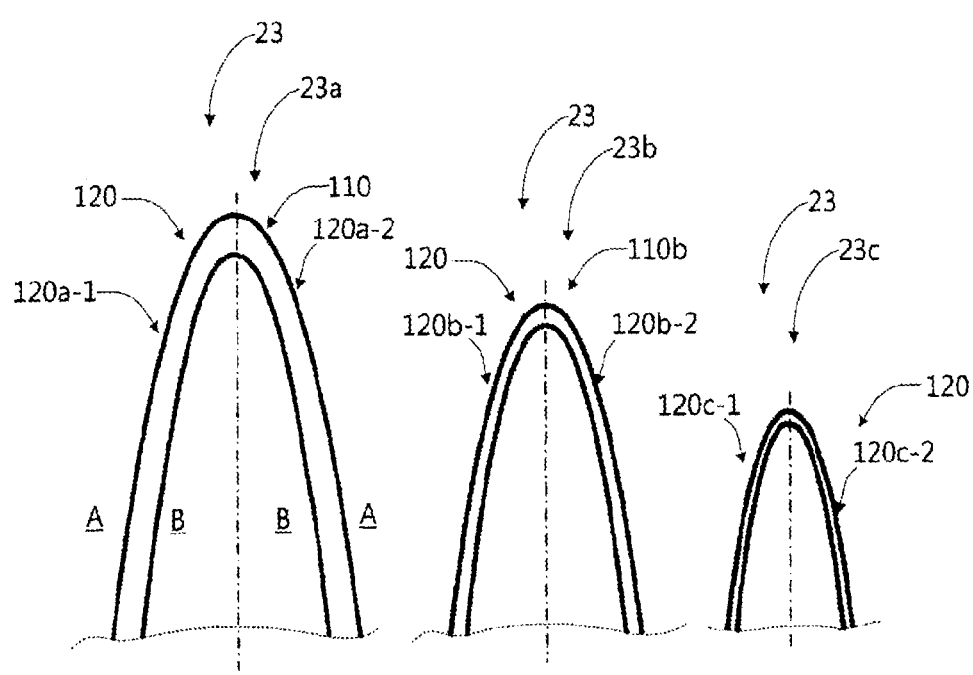

FIGS. 2a, 2b and 2c and FIGS. 3 to 6 show one embodiment of the flow body component 1 according to the invention as a front part of a vertical stabiliser L. FIG. 2b shows a lateral view of the vertical stabiliser L and FIG. 2c shows a disaggregated component view of the vertical stabiliser according to FIG. 2a. As shown in the disaggregated component view of the vertical stabiliser of FIG. 2c, the vertical stabiliser L in the embodiment shown comprises a vertical stabiliser base body 22 and a rudder 21 articulated thereto. It is also possible for several rudders to be coupled to the vertical stabiliser main body 20, which rudders are arranged one behind the other in the spanwise direction S-HS of the horizontal tail unit. In front of, in other words against, i.e. opposite to, the direction of flow or against the aircraft longitudinal axis X in front of the vertical stabiliser base body 22 a flow body component 1 according to the invention, in the form of a leading edge body 23, provided for suction-extraction of fluid, is arranged on said vertical stabiliser base body 22, which leading edge body 23 has a design that is aerodynamically favourable to a front part, i.e. a part subjected to incident flow, of the vertical stabiliser L. As shown in FIGS. 4 to 6, the outside contour of the cross section of the leading edge body 23 in the chord direction and the thickness direction T-L, D-L of the vertical stabiliser L is concave in shape and can, in particular, be of a semi-ellipsoid shape or of an approximately semi-ellipsoid shape.

The depicted leading edge body 23 is a flow body component 1 comprising: a front profile plate portion 110 and two profile plate portions 120 according to the invention, which profile plate portions 120 in each case extend from the profile ends of the front of the flow body 110 in the flow body chord direction B-C in the form of sidewall profile plate portions 120, wherein the aforesaid can, at least in some sections, in the entire thickness direction be permeable to fluid, or of which in each case only an outer layer, in particular a first or outer profile plate panel 121, 122 can be designed so as to be permeable to fluid.

Generally speaking, the flow body component 1 or the leading edge body 23 according to the invention can be formed by several functional sections that in spanwise direction are arranged one behind the other. In this arrangement each functional section can comprise a section of the front profile plate portion 110 of the respective flow body to which in each case two functional sections of the sidewall profile plate portions 120 or sidewall profile plate portions 120 are connected that extend from the profile ends of the respective section of the front of the flow body 110 in the flow body chord direction B-C.

According to the invention, the flow body component 1, which in this document is principally described in relation to a vertical stabiliser L, or the leading edge body 23, which in this document is principally described in relation to a vertical stabiliser L, can also be provided or adapted for use with other flow bodies, in particular a main wing, a control flap or a high-lift body. Accordingly, according to the invention, the individual characteristics described in relation to a vertical stabiliser L can be transferred, i.e. adapted, to the use as a flow body component 1 of other flow bodies.

In the embodiment of the flow body component 1 of a vertical stabiliser L, which embodiment is shown in FIG. 2c, the leading edge body 23 or the flow body component 1 comprises three sections, namely a first leading edge body functional section 23a, a second leading edge body functional section 23b and a third leading edge body functional section 23c. Each leading edge body functional section 23a, 23b, 23c in each case comprises a front profile plate portion 110a, 110b and two sidewall profile plate portions 120a-1, 120a-2 or 120b-1, 120b-2 or 120c-1, 120c-2 connected thereto and opposing each other and curved in the opposite direction relative to each other. Underneath the first leading edge body functional section 23a a first leading edge body base component 24a is arranged, and above the first leading edge body functional section 23a a leading edge body top 24b is arranged which, when viewed along the spanwise direction S-L of the vertical stabiliser, form the two ends of the leading edge body 23. The leading edge body base component 24a, the leading edge body functional sections 23a, 23b, 23c and the leading edge body top 24b form a uniform aerodynamic partial profile, in particular when viewed in the spanwise direction of the horizontal tail unit HS, which partial profile is arranged in front of the base body 22. Generally speaking, at the front end of the flow body the flow body component 1 is arranged, which comprises a front profile plate portion 110 that is permeable to fluid, and two sidewall profile plate portions 120 which in each case extend from the profile ends of the front of the flow body 110 in the flow body chord direction B-C. The front profile plate portion 110 and the sidewall profile plate portions 120 can be formed, when seen in the spanwise direction of the flow body, only by a respective front profile plate portion 110 and by a sidewall profile plate portion 120, respectively.

The illustrations in FIGS. 3 to 6 show that in the embodiment shown, because of the continuous reduction in the cross section of the leading edge body 23 in the spanwise direction S-L, the local thickness of the leading edge body 23 decreases continuously. In this manner a weight-optimised construction is achieved. In an analogous manner it can be provided that in the spanwise direction of a control flap or of a high-lift body or of a main wing, namely in the direction from the aircraft longitudinal axis X towards the outside or towards the wingtip, the local thickness at a leading edge body 23 in each case provided on the aforesaid decreases continuously.

Generally speaking, the profile plate portion 120 according to the invention comprises in particular:
- at least in some sections a first profile plate panel 121 against which during intended use of the profile plate portion 120 there is a flow, wherein the first profile plate panel 121 is permeable to fluid in such a manner that in some sections fluid can flow through said profile plate panel 121,
- a second profile plate panel 122, which at least in some sections extends along the first profile plate panel 121 and is spaced apart from the aforesaid in a local profile plate thickness direction,
- a reinforcing device 150 for supporting the first profile plate panel 121 and the second profile plate panel 122 on one another.

Figure 7:
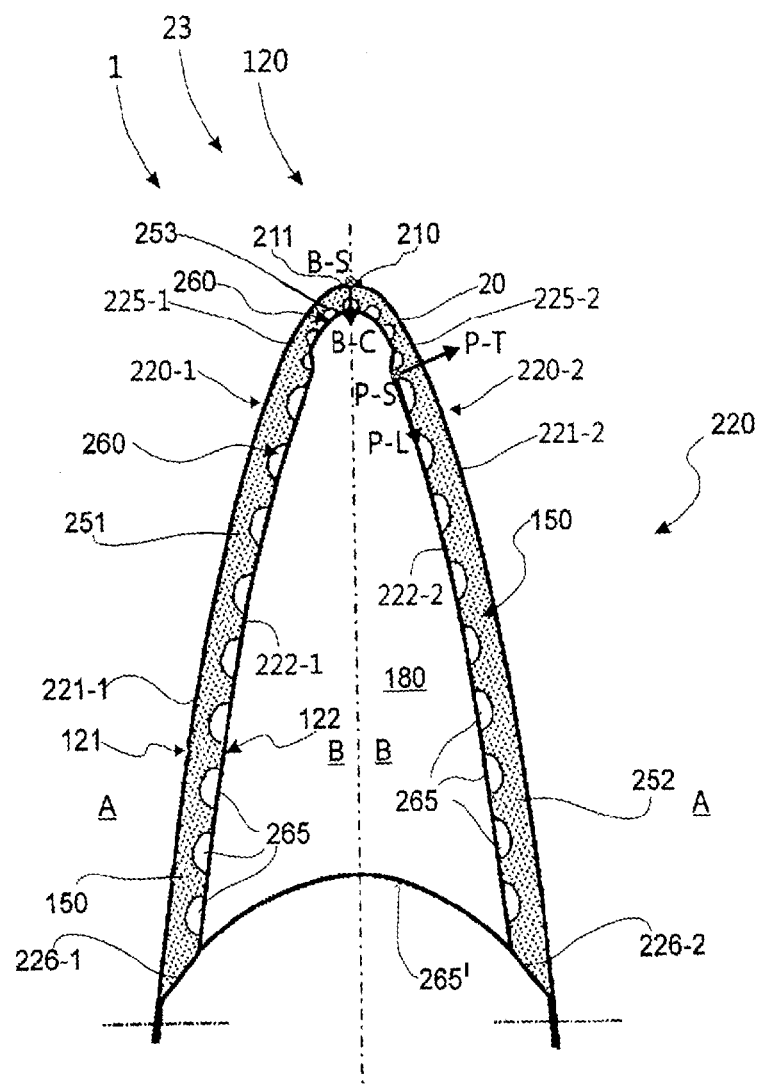

FIG. 7 shows one embodiment of the flow body component 1 according to the invention in an application as a leading edge body 23 of a vertical stabiliser. The leading edge body 23 or the flow body component 1 comprises a front profile plate portion 210 and laterally adjoining sidewall profile plate portions 220-1, 220-2 that extend along each other. In each case both the front profile plate portion 210 and the sidewall profile plate portions 220-1, 220-2 are designed as a profile plate portion 120. The front profile plate portion 210 is also a nose section of the leading edge body 23 or of the flow body component 1, in other words of a structural component.

The front profile plate portion 210 and the laterally adjoining sidewall profile plate portions 220-1, 220-2 in each case comprise an outer or first outer profile plate panel 211 or 221-1 or 221-2 and a second, inner, profile plate panel 212 or 222-1 or 222-2 as well as an intermediate layer 253 or 251 or 252 preferably comprising metal foam, which intermediate layer 253 or 251 or 252 is situated between the respective first and second profile plate panels. Generally speaking, in this arrangement the outer or first outer profile plate panels 211 or 221-1 or 221-2 are the panels situated on the outside of the respective flow body component, in other words the panels subjected to the flow around the flow body component.

Thus the front profile plate portion 210 and each of the sidewall profile plate portions 220-1, 220-2 in each case is designed as a profile plate portion 120 according to the invention, which profile plate portion 120 comprises in particular:
- at least in some sections a first profile plate panel 121 or 211 or 221-1 or 221-2 against which during intended use of the profile plate portion 120 there is a flow, wherein the first profile plate panel is designed so as to be permeable to fluid in such a manner that in some sections fluid can flow through said profile plate panel,
- a second profile plate panel 122 or 212 or 222-1 or 222-2, which at least in some sections extends along the first profile plate panel 121 or 211 or 221-1 or 221-2 and is directly spaced apart from the aforesaid in a local profile plate thickness direction P-T,
- a reinforcing device 150 in the form of an intermediate layer 253 or 251 or 252, situated between the respective first and second profile plate panels, for mutually supporting the respective first profile plate panel 121 or 211 or 221-1 or 221-2 and the second profile plate panel 122 or 212 or 222-1 or 222-2.

The embodiments according to the invention of a flow body component 1 in its implementation as a front part of a flow body with a profile depth PT for an aircraft or an aircraft component on a tail unit or on a wing, the front profile plate portion 210, when viewed in the chord direction T-L or T-HS or T-H of the respective component, extends to a position that is preferably situated at 3% to 5% and generally at 3% to 8% of the entire profile depth PT of the respective component when viewed from its front end. This value can, in particular, apply to any herein described embodiment of a flow body component 1; it applies to every spanwise position of the respective component, on which position the local profile depth PT of the respective component depends. Furthermore, generally speaking, the sidewall profile plate portions 220-1, 220-2 in the embodiments according to the invention preferably extend to a position which is preferably at 15% to 25% and in particular at 15% to 20% of the entire profile depth PT of the respective component when viewed from its front end.

In the embodiment of the profile plate portions 220-1, 220-2, 210 the reinforcing device 150 is designed as an intermediate layer 251 or 252 or 253.

Generally speaking, the profile plate panels of the profile plate portion 120 according to the invention, whether said profile plate portion 120 is designed with an intermediate layer as shown in FIG. 7 or otherwise, can in each case be designed in various ways, for example as a panel or as mesh or as a mesh arrangement (FIGS. 13, 14) comprising holes and in particular as a panel comprising microholes or microperforations.

According to one embodiment of the flow body component 1 shown in FIG. 7, the reinforcing device 150 of the sidewall profile plate portions 220-1, 220-2 and of the front profile plate portion 210 is designed as an intermediate layer, situated between the panels, which intermediate layer is two-dimensionally connected at least to the respective first panel 211 or 211-1 or 211-2. As an alternative to the above the reinforcing device 150 of only one or several of the profile plate portions 210 or 220-1 or 220-2 can be designed as an intermediate layer situated between the panels.

According to a preferred embodiment of the invention, in the design of the profile plate portions 210, 220-1, 220-2 with an intermediate layer 253 or 251 or 252 the respective outer or first profile plate panel 211 or 221-1 or 221-2 is designed as a mesh or a mesh arrangement. The intermediate layer rests flat against the respective outer or first outer profile plate panel 211 or 221-1 or 221-2.

Figure 8:
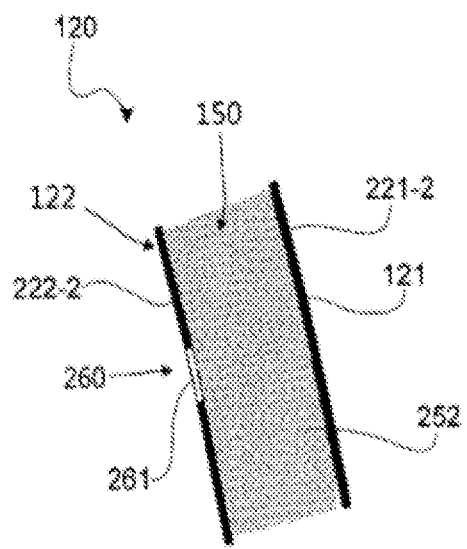

On the inner side B of the profile plate portions 210 or 220-1 or 220-2 aperture devices 260 are provided so that fluid or air that flows from the outside or the flow side A through the outer or first outer profile plate panel 211 or 221-1 or 221-2 into the profile plate portions 210 or 220-1 or 220-2 can flow on the inner side B from the aforesaid. For this purpose, apertures 261 are provided on the inner or second profile plate panels 212 or 222-1 or 222-2 (FIG. 8).

Additionally, aperture devices 260 can be disposed in the region lying at the inner side B and therefore at the side of the intermediate layer 253 and 251 and 252, respectively, which faces the inner side B, which aperture devices 260 can be formed as recesses 265 in the intermediate layer 253 and 251 and 252, respectively, in predetermined distances to each other, by which recesses 265 the intermediate layer opens in direction to the inner or second profile plate panels 212 or 222-1 or 222-2. In this case at least one of the apertures 261 of the inner profile plate panel 212 or 222-1 or 222-2, when viewed in the longitudinal extension of the inner profile plate panel 212 or 222-1 or 222-2, is situated above a respective recess 265 so that the fluid that flows in the thickness direction P-T through the recesses 265 can reach the inside B through a respective aperture 261.

With a corresponding design of the foam core layer 150 of adequate strength, the profile plate portion 120 or the profile plate portion 210 or 220-1 or 220-2 can also be designed without comprising an inner or second profile plate panel 212 or 222-1 or 222-2, wherein the intermediate layer 253 or 251 or 252 comprises recesses 265 according to the invention.

Figure 26A:
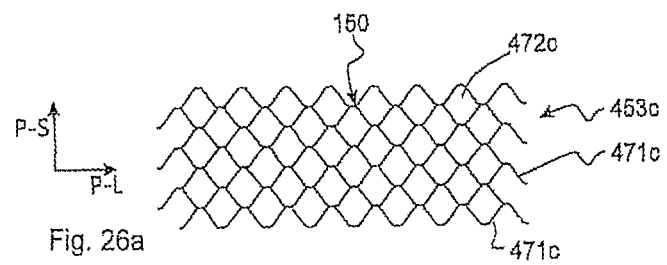
FIGS. 26a and 26b are diagrammatic top views of a cross section of a section of a profile plate portion according to the invention in the plane thereof defined by the longitudinal direction and the spanwise direction, wherein the reinforcing device comprises supporting walls that in the cross section shown result in a scale-like arrangement of chambers or in an arrangement of droplet-shaped chambers, FIG. 27 a cross section of a supporting device of the front profile plate portion of the flow body component according to FIG. 15, which supporting device has been designed as an alternative to the supporting device according to FIG. 21, wherein the cross-sectional view results in the plane defined by the longitudinal direction and the thickness direction, FIG. 28 a cross section of a reinforcing device of a profile plate portion according to the invention in the plane of the profile plate portion, which plane is defined by the longitudinal direction and the thickness direction, wherein the reinforcing device has been implemented as a framework, FIG. 29 a cross section of one embodiment of a profile plate chamber, formed by a reinforcing device, viewed in the plane of the profile plate portion, which plane is defined by the longitudinal direction and the thickness direction, with the fluid pressure present on the outer or first profile plate panel of the profile plate portion being shown, wherein the first profile plate panel of the profile plate portion is designed according to a first embodiment, FIG. 30 the pressure gradient in the profile plate chamber according to FIG. 29, FIG. 31 a cross section of one embodiment of a profile plate chamber, formed by a reinforcing device, viewed in the plane defined by the longitudinal direction and thickness direction of the profile plate portion, with the fluid pressure present on the outer or first profile plate panel of the profile plate portion being shown, wherein the first profile plate panel of the profile plate portion is designed according to a further or second embodiment.
Figure 26B:
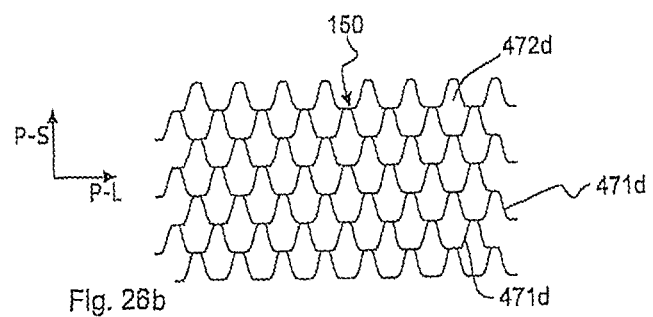

In one embodiment of the profile plate portion 120 and/or of the profile plate portions 210 or 220-1 or 220-2 with a foam core layer 150 it can, in particular, be provided that supporting stays (in FIG. 7 not shown; in FIGS. 26a and 26b shown in the context of a front profile plate portion) are incorporated in the foam core layer 150, which supporting stays are designed so as to be impermeable to fluid, which supporting stays are situated between the respective panels 211 and 212 or 221-1 and 221-2 or 222-1 and 222-2, thus interconnecting the aforesaid. The supporting stays extend in or along the spanwise direction P-S so that, between the aforesaid within the respective panels that in each case extend along each other, chambers form that extend in their longitudinal direction along the spanwise direction P-S so that fluid received therein cannot spread in the longitudinal direction P-L over the aforesaid.

Figure 9:
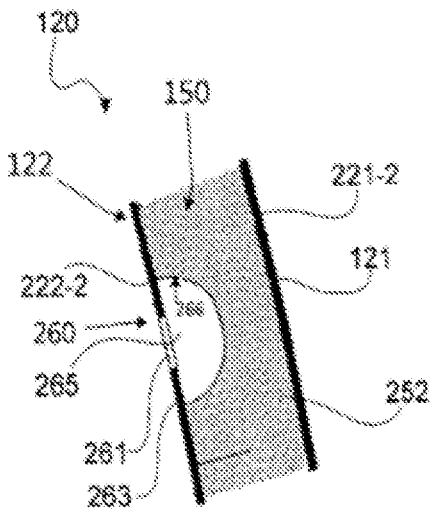
Figure 10:
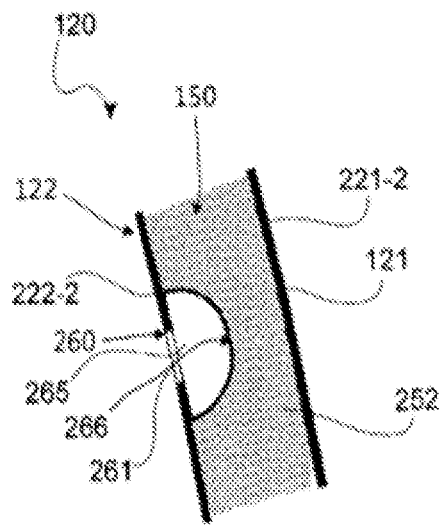
Figure 11:
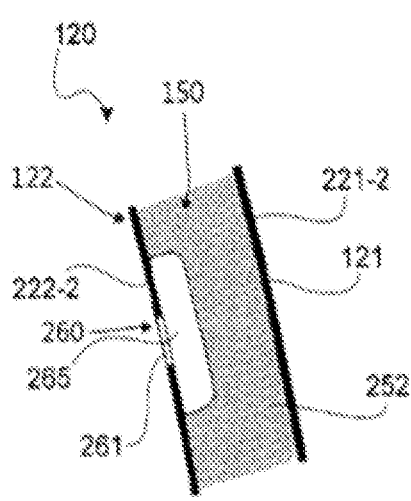
Figure 12:
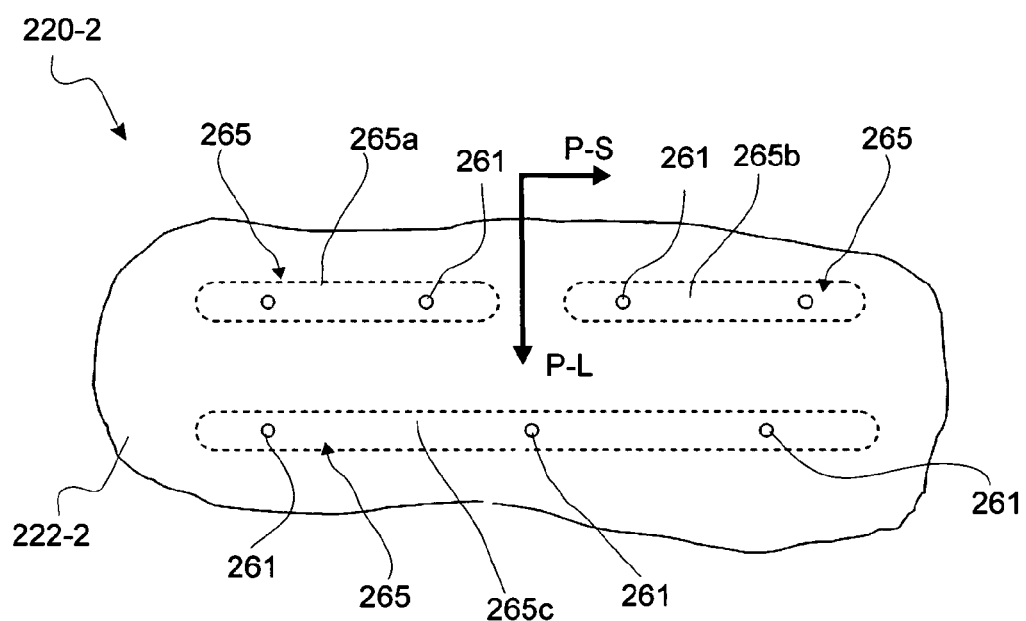

Below, with reference to FIGS. 8 to 12, various embodiments of the aperture devices 260 or recesses 261 in an exemplary manner relating to the profile plate portion 220-2 are generally described in more detail in relation to a profile plate portion 120 according to the invention, which profile plate portion 120 comprises an intermediate layer, for use as an outer wall of a flow body component 1:

FIG. 8 shows a section of a first embodiment of the sidewall profile plate portion 220-2 with a foam core intermediate layer 253 or 251 or 252 and in particular with a metal foam core intermediate layer, wherein the interior or second profile plate panel 212 or 222-1 or 222-2 comprises apertures 261 to let through fluid that flows through the sidewall profile plate portion, FIG. 9 shows a section of a second embodiment of the sidewall profile plate portion 220-2 in which, when compared to the embodiment shown in FIG. 8, the intermediate layer 253 or 251 or 252, in particular in the form of a foam core intermediate layer, and in particular in the form of a metal foam core intermediate layer, comprises a recess 265 of a first shape, FIG. 10 shows a section of a third embodiment of a sidewall profile plate portion 220-2 in which, when compared to the embodiment shown in FIG. 9, the inwards-directed surface comprises a layer, FIG. 11 shows a section of a fourth embodiment of a sidewall profile plate portion 220-2 in which, when compared to the embodiment shown in FIG. 9, the foam core intermediate layer, the intermediate layer 253 or 251 or 252, in particular in the form of a foam core intermediate layer, comprises a recess 265 of a second shape, FIG. 12 shows the inner profile plate panel 222-2 of one embodiment of a sidewall profile plate portion 220-2 which is shown in a view from the inside or interior B, and a surface region visible from the flow body component 1, of the inner profile plate panel 222-2 with apertures 261 incorporated therein and, shown in dashed lines, an arrangement of recesses 265a, 265b, 265c.

FIG. 8 shows a cross section of one embodiment of the sidewall profile plate portion 220-2 or of the wall section as an example of a profile plate portion 120. From the outside to the inside, in other words in FIG. 8 from right to left, the sandwich structure of the sidewall profile plate portion 220-2 is designed as follows: an outer profile plate panel 221-2 or outer cover plate, which in particular can comprise a mesh or a mesh arrangement 142, is followed by a foam core 252, that in particular can be a metal foam core or an open-pore, i.e. porous metal foam core, preferably comprising a titanium alloy or a nickel-iron-based alloy, wherein the foam core or the metal foam core can, in particular, comprise corrosion-resistant material. Towards the inside the wall section is finished off by an inner or second profile plate panel 222-2 or an inner cover plate that comprises apertures 261. FIG. 8 as well as the following FIGS. 9 to 11 each only shows an individual aperture 261 in the form of an orifice wherein, however, a multitude of apertures 261 are distributed over the inner or second profile plate panel 222-2. In the embodiment of FIG. 8 the fluid flows through the opening cross section of the aperture 261. The further regions of the porous foam core or metal foam core 252, which regions adjoin the inner or second profile plate panel 222-2, are not of any significance in terms of the removal of the airflow. The aperture cross section of the apertures 261 thus forms the bottleneck in terms of quantity, in other words the throughput of suction-extraction of the airflow, which throughput cannot be increased at will because otherwise the mechanical stability of the sidewall profile plate portion 220-2 would be reduced.

In order to improve suction-extraction of the airflow while largely maintaining the mechanical stability, as shown in FIG. 9, the profile plate panel 122 can be formed in various embodiments. According to FIG. 9 the recess 265 comprises either a spherical delimitation area to the foam core 252 or porous metal foam core 252, or a semi-cylindrical delimitation area to the porous metal foam core 252. In either case the active suction-extraction cross section between the recess 265 and the foam core 252 or porous metal foam core 252 increases. In the present case the suction-extraction cross section of the recess 265 is approximately four times as large; however, in a generally preferred embodiment it is at least 1.5 times as large as the aperture cross section of the aperture 261 in the second profile plate panel 222-2. In this manner the pressure loss in the interior of the sidewall profile plate portion 220-2 is reduced so that with an identical aperture cross section of the aperture 261 in the second profile plate panel 222-2 a significantly larger quantity of airflow can be removed by suction-extraction. It should be pointed out that as a result of flowing or of the suction-extraction of fluid such as air from the foam core 252 or porous metal foam core 252 the active, in other words readily accessible, flow cross section or suction-extraction cross section of the foam core 252 or porous metal foam core 252 is influenced.

In each case the aperture 261 can comprise an aperture area that is smaller than the aperture area of the recess 265, which in each case is associated with the aperture 261. This is in particular the case if a recess 265 covers a multitude of apertures 261. In this arrangement the second profile plate panel 212 or 222-1 or 222-2 forms a protrusion 263 vis-à-vis the adjacent end of the recess 265. Consequently, in the associated region of the profile plate portion the throughput of fluid can be improved and can also be adjusted in a simple manner. Furthermore, in this manner the aspect of more efficient manufacture of the profile plate portion 120 or of the foam layer 150 can be met, while at the same time adjustment or achievement of a particular through-flow characteristic of the profile plate portion 120 can be brought about.

When compared to the embodiment of the profile plate portion 210 or 220-1 or 220-2 according to FIG. 9, the embodiment of the profile plate portion 210 or 220-1 or 220-2 shown in FIG. 10 differs in that on the outside 266 or contact area of the recess 265 with the porous metal foam core 252 a strengthening layer or a strengthening element is provided. This strengthening layer is used to provide mechanical support to the recess 265, because the recess 265 results in the weakening of the porous metal foam core 252 and thus of the sidewall profile plate portion 220-2. Such weakening is mechanically compensated for by means of the strengthening layer.

FIG. 11 shows the embodiment of the recesses 265 as an essentially rectangular shape. This embodiment, too, can comprise a strengthening layer. FIG. 12, for all forms of recesses shows one embodiment as elongated grooves that are arranged so as to be essentially parallel to each other and offset from each other in the longitudinal direction. In this context, FIG. 8 clearly shows that in each recess 265 more than one aperture 261 is arranged. In this manner, on the one hand an exchange of suction-extracted airflow in the longitudinal direction of the grooves becomes possible, and on the other hand the active suction-extraction cross section of the recesses 265 is very much enlarged. In these cases the active suction-extraction cross section of the recesses 265 in many application cases can be approximately 60 times, and generally between 5 times and 100 times the aperture cross section of the apertures 261 in the inner cover plates.

In terms of the manufacture of the apertures in the inner cover plates and in the inner profile plate panels it can be provided that these are made in the profile plate panels in a flat state of the profile plate panels, in other words prior to producing the desired curvature of the profile plate panels. The apertures 261 can, for example, be manufactured by means of laser beam drilling or other drilling methods, preferably in the interior nose sheet 82 in its still flat state.

The described embodiments of the aperture devices and in particular of the apertures 261, optionally in conjunction with recesses 265, are generally applicable to profile plate portions 120 or 210 or 220-1 or 220-2 that are designed with an intermediate layer and in particular a foam layer or a foam core. In this arrangement the connection between the intermediate layer and in particular the foam layer or foam core or porous metal foam core and the first outer profile plate panel 211 or 221-1 or 221-2 and the second profile plate panel 212 or 222-1 or 222-2 can take place by way of sintering or diffusion welding.

In the embodiment of FIG. 7 the sidewall sections or sidewall profile plate portions 220-1, 220-2 are integrally connected to the front profile plate portion 210 in the form of a nose section. In this arrangement it is, in particular, possible for the respectively adjacent profile plate panels and the respectively adjacent intermediate layers 150 to merge into each other and, in particular, to be of a single-part design.

The foam layer or the foam core can, in particular, be a foam layer comprising a foam and preferably a foam layer comprising a metallic material, in other words a metal foam layer. In this arrangement the metal foam layer can be designed as a porous metal foam layer so that the profile plate portions form a porous metal foam core 252.

In this arrangement the thickness of the porous metal foam core 252 between the profile plate panels can vary along the chord direction B-C (compare FIGS. 4 to 6). Thus the porous metal foam core 252 in the front profile plate portion 210 and in the front region of the sidewall profile plate portions 220-1, 220-2 can be less thick than in a rear region of the sidewall profile plate portions 220-1, 220-2.

Figure 13:
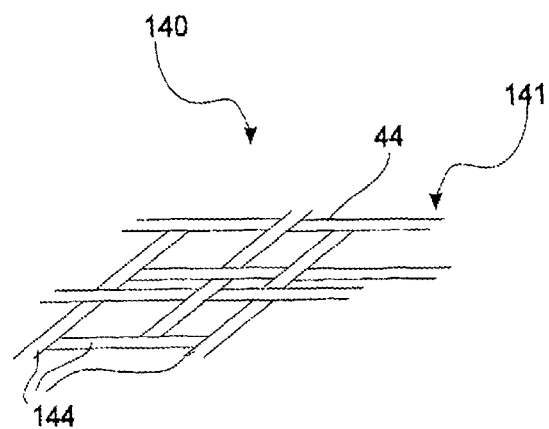
Figure 14:
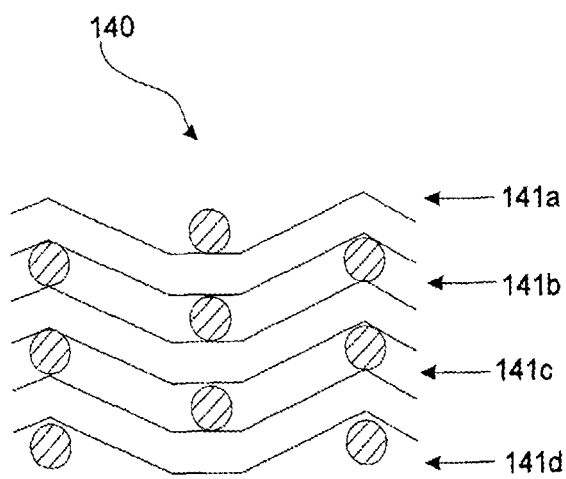

According to one embodiment of the profile plate panels for the sidewall profile plate portions 220-1, 220-2 and/or for the front profile plate portion 210, the aforesaid comprise, in particular in the design of the reinforcing device 150 as an intermediate layer affixed to the profile plate panels, mesh or mesh arrangement 140 of at least one mesh layer 141, in particular comprising metal. FIG. 13 shows a perspective view of a layer 141 of such a mesh, from which the first or the second profile plate panel of the respective profile plate portion 120 can be formed. FIG. 14 shows a cross-sectional view of one embodiment of a profile plate panel as a mesh arrangement with several mesh layers 141a, 141b, 141c, 141d in each case according to FIG. 13.

Various types of fabric weave can be used for the mesh layer, for example regular or irregular twill fabrics. Thus the cross section of the embodiment according to FIG. 1a shows that the individual metal wires 144 extend in different planes but not exclusively within these planes. Instead, the metal wires 144 extend in an undulating manner and in each case so as to be offset from each other at an angle of 90°. The individual metal wires 144 alternatingly extend over each other and under each other, and in this manner mesh to form a mechanically stable metal mesh arrangement 142.

In this arrangement the permeability of this metal mesh arrangement 142 is given as a result of the spaces between the individual metal wires 44, which spaces automatically arise in the mesh, and the resulting holes or pores. Depending on the density of the mesh and the distance between the individual metal wires 144, in this manner greater or lesser mechanical stability and also greater or lesser permeability can be set.

In this arrangement the metal mesh arrangement 140 per se is, in other words the individual metal wires 144 among themselves are, connected by diffusion welding. Thus the individual layers of the metal mesh arrangement per se, and also the individual layers of the metal mesh arrangement among themselves, are interconnected by way of diffusion welding. As a result of the use of the diffusion welding method, in this arrangement connections between the metal wires 144 are established that on the one hand are particularly durable, and on the other hand are also particularly simple, in other words economical, to manufacture. In this arrangement the diffusion welding process is carried out in a tool at approx. 1000° C. and ranging between 10 bar and 85 bar, in particular between 20 bar and 60 bar, for the duration of several hours, for example 3 hours. In principle a host of different mesh structures are imaginable. For example, it is possible for the individual metal wires 44 to extend relative to each other so as to be offset by approx. 90 degrees, as shown in FIGS. 13 and 14, with said metal wires 44 alternatingly extending over and under each other. Thus, by way of a multitude of contact points of the individual metal wires great mechanical stability is created and at the same time by means of the spaces between the contact points and the metal wires 144 adequate apertures are created that result in the desired permeability of the top cover plate.

FIG. 7 shows a cross section of one embodiment of a flow body component 1 according to the invention or of a structural component in which the sidewall profile plate portions 220-1, 220-2 with their first ends 225-1 or 225-2 are affixed or connected to the front profile plate portion 210 or, because of a uniform design of the front profile plate portion 210 with sidewall profile plate portions, make a transition to the front profile plate portion 210. In the embodiment of the flow body component 1 shown, the second ends, when viewed in relation to the chord direction B-C, are interconnected by means of a partition wall 265' so that a fluid channel 180 results which extends in the spanwise direction B-S of the flow body component 1. In the embodiment shown, the fluid channel 180 is situated between the profile plate portions 210 or 220-1 or 220-2 and the partition wall 265' so that the entire interior B of the flow body component 1 is available for conveying fluid. In this arrangement, for the purpose of improving the strength of the flow body component 1, the partition wall can be designed to be curved. In the use of the flow body component 1 for example for the tail unit or the wing of an aircraft, behind the partition wall 265' and thus at the respective ends 226-1, 226-2 of the sidewall profile plate portions 220-1, 220-2, the spar fittings for mounting of the flow body component 1 to the bearing spar of the flow body component are arranged. Preferably behind the partition wall 265', in other words outside the fluid channel 180, attachment arrangements and/or devices for mounting electrical lines and/or hydraulic lines can be provided.

Below, the function of the flow body component 1 for laminarisation of a flow acting on the aforesaid or on a flow body with such a flow body component 1 is described with reference to the embodiment of the flow body component 1 according to the invention according to the figure.

Generally speaking, according to the invention it can be provided that the fluid channel 180 can passively receive fluid when the pressure conditions in the fluid during penetration of the profile plate portions 210 or 220-1 or 220-2 and the pressure conditions within the fluid channel 180 in the spanwise direction B-S are correspondingly set, taking into account the flow which during intended use prevails in the outside region A of the flow body component As an alternative to the above, generally speaking, according to the invention it can be provided that at the fluid channel 180 a pump (not shown) is connected which for suction-extraction of fluid from the outside A to the inside B is correspondingly controlled or, depending on sensor values and the specification of desired values such as the desired throughput of the fluid through the fluid channel 180, is regulated, for example by a fluid control device (not shown).

At the outside of the structural component an airflow is present which in FIG. 7 flows from top to bottom. The airflow thus first impinges the front profile plate portion 210 where it splits up. The divided flow subsequently follows the two sidewall sections or profile plate portions 220-1 or 220-2 to the respectively subsequent component of an aircraft (not shown in FIG. 7). When the airflow impinges the front profile plate portion 210 and when it flows around the profile plate portions 220-1 or 220-2, depending on the flow situation and flow speed, there is a danger of turbulent flow regions forming. This is prevented in that in the fluid channel 180 negative pressure is applied by way of a pump connected to this central air channel. The negative pressure propagates, via the fluid-communicating connection of the fluid channel 180, by way of the apertures 261 in the inner cover plates of the sidewall sections and through the porous metal foam core 253, and is thus present on the inside of the metal mesh arrangement 140. The negative pressure present in that location sucks air through the metal mesh arrangement 140 and subsequently through the porous metal foam core 253, thus removing air from the airflow on the outside of the sidewall sections. In this manner, in other words by the suction-extraction of air from the outside of the profile plate portions 220-1 or 220-2, the formation of turbulence is prevented, and the flow is laminarised. By way of the apertures 261 in the inner cover plates, the suction-extracted air is fed into the fluid channel 180 and from there is passively taken away due to the prevailing pressure conditions in the fluid, and/or is actively taken away by means of the pump.

In this arrangement the air taken away can be conveyed to further systems of an aircraft, which systems require compressed air. This includes, for example, the air conditioning system in the cabin of the aircraft, or other flow-influencing devices that require compressed air. As an alternative the suction-extracted air can also be conveyed overboard by way of a valve.

Apart from suction removal on the sidewall profile plate portions 220-1, 220-2, in the embodiment of FIG. 7 it is also possible to suction-extract fluid, in particular air, from the airflow at the front profile plate portion 210. For this purpose the fluid channel 180 is in direct fluid-communicating contact with the apertures 261 in the outer profile plate panel 211, through which apertures 261, by way of the negative pressure present on the inside of the outer profile plate panel 211, air from the porous metal foam core 252 is sucked to the inside. In this manner essentially on the entire outside of the flow body component 1 air is sucked into the central air channel, and thus flow laminarisation essentially on the entire outside surface of the structural component is carried out.

Figure 15:
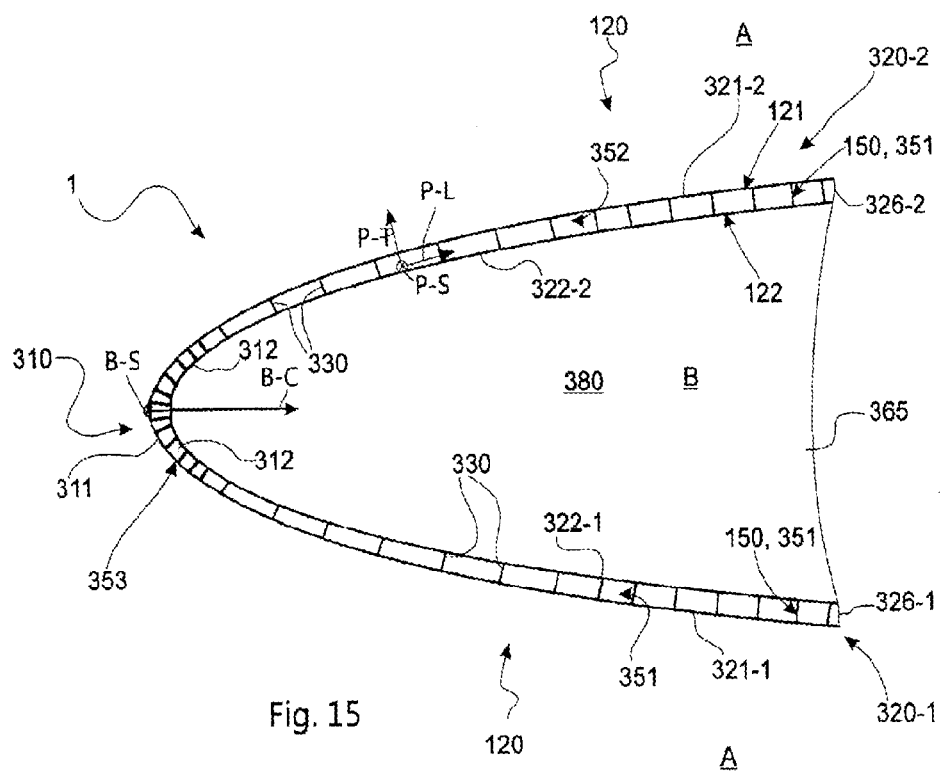

The embodiment, shown in FIG. 15, of the flow body component 1 according to the invention comprises a front profile plate portion 310 and the laterally adjoining sidewall profile plate portions 320-1, 320-2. The outer or first profile plate panels 311 or 321-1 or 321-2 and the inner or second profile plate panel 312 or 322-1 or 322-2 are designed so as to be permeable to fluid. The ends 326-1 and 326-2 of the sidewall profile plate portions 320-1 or 320-2, which ends are situated opposite the front profile plate portion 310, are connected by a partition wall 365 to form a fluid channel 380 with the described functionality in the interior B of the flow body component 1. In this arrangement the flow of the suction-extracted air in the fluid channel 380 at that location is caused passively because of the prevailing pressure conditions in the fluid and/or actively by means of the pump.

The reinforcing device 150 or 353 or 351 or 352 of the front profile plate portion 310 and/or of the laterally adjoining sidewall profile plate portions 320-1, 320-2 comprises a supporting device 330 that can be designed in various ways.

Figure 16:
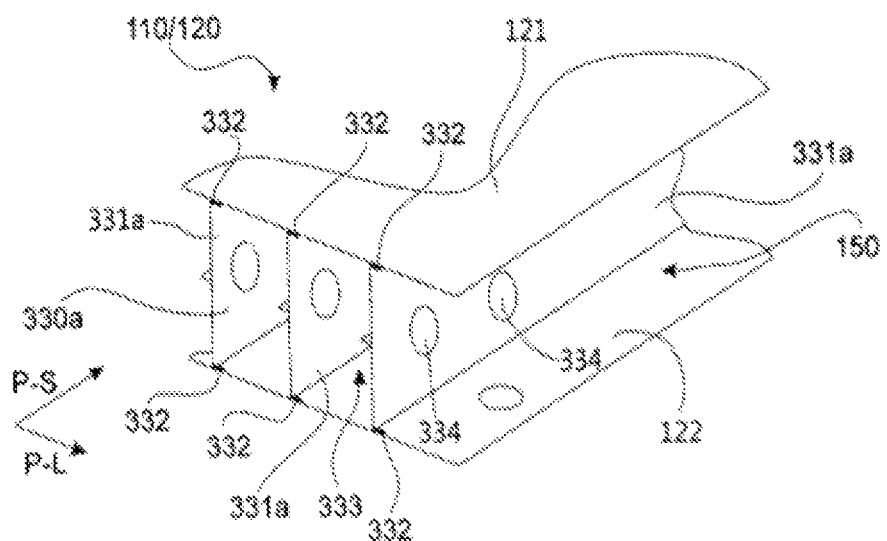

FIG. 16 shows a first embodiment, designated with reference character 330a, of the supporting device 330 which, in particular, can be implemented in the front profile plate portion 310 and/or in the laterally adjoining sidewall profile plate portions 320-1, 320-2 according to FIG. 15. The profile plate panels can generally be profile plate panels of the front profile plate portion 110 or 320-1, 320-2 or of the laterally adjoining sidewall profile plate portions 220 or 320-1, 320-2; they are designated with reference character 121, 122. The aforesaid comprise a number of supporting stays or stay plates 331a which extend side by side in the longitudinal direction P-L and along the local spanwise direction P-S. The width direction of the supporting stays 331a extends essentially in the direction of the shortest distance between the contact points of the supporting stays 331a on the profile plate panels 121, 122 or perpendicularly, and in particular at an angle of between 80 and 100 degrees relative to the profile plate panels 121 and 122, which extend in the plane defined by the directions P-L and P-S. The supporting stays 331a are attached to the respective profile plate panels 121, 122 by means of joints 332, which can, in particular, be implemented by soldered joints or welded joints. Between the supporting stays 331a and across the longitudinal extension of the aforesaid or viewed in the longitudinal direction P-L, in each case a space 333 is formed. In the supporting stays 331a or in some of the supporting stays 331a at least one aperture 334 is provided. In one embodiment of the profile plate panel 110, 120 according to FIG. 16 there is at least one aperture 334 in each of the supporting stays 331a so that in this exemplary embodiment the fluid can flow between the profile plate panels 121, 122 in the longitudinal direction P-L through the interspaces which are connected to each other by the apertures 334. This embodiment of the reinforcing device 150 can, in particular, be applied in the embodiment of the flow body component 1 according to FIG. 35 for the purpose of forming the fluid channels 681, 682.

Figure 17:
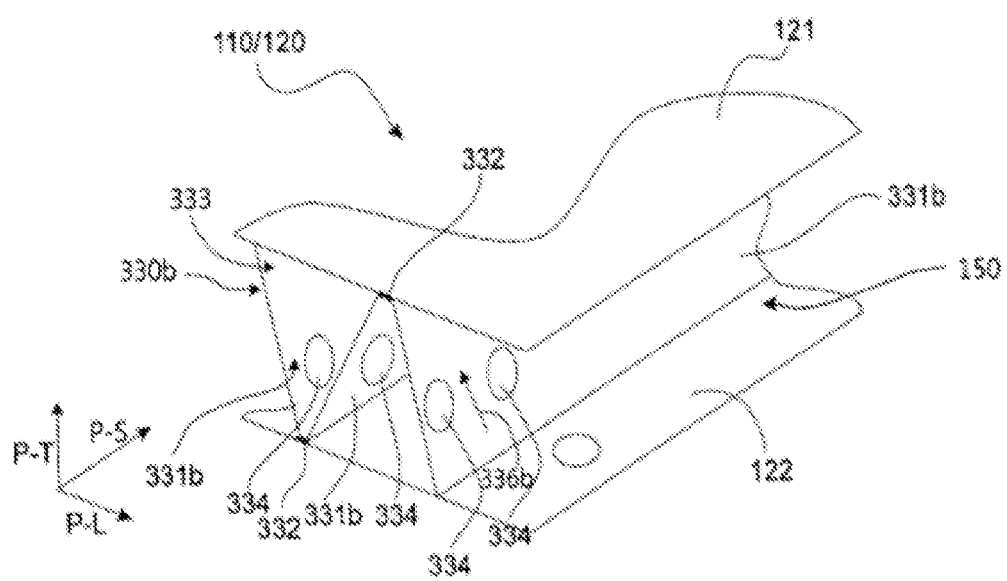

FIG. 17 shows a first embodiment, designated with the reference character 330b, of the supporting device 330 that can, in particular, be implemented in the front profile plate portion 310 and/or in the laterally adjoining sidewall profile plate portions 320-1, 320-2 according to FIG. 15. The profile plate panels can, generally speaking, be profile plate panels of the front profile plate portion 110 or 320-1, 320-2 or of the laterally adjoining sidewall profile plate portions 220 or 320-1, 320-2; they are designated with reference characters 121, 122. The aforesaid comprises a number of supporting stays or stay plates 331b which extend side by side in the longitudinal direction P-L and along the local spanwise direction P-S. The width directions 336b of the supporting stays 331b extend at an angle to each other so that the width directions 336b of two supporting stays 331b situated side by side at respective adjacent ends or borders point at each other when viewed in the plane defined by the directions P-T and P-L. In this arrangement, the angle between the supporting stays 331b and the longitudinal extension of the profile plate panels 121 and 122 at the respective position can, in particular, be in an angular range of between 30 and 75 degrees when viewed in the plane defined by the directions P-T and P-L. The supporting stays 331b are attached to the respective profile plate panels 121, 122 by means of joints 332 that can, in particular, be implemented by means of soldered joints or welded joints, wherein adjacent supporting stays 331b at their respective adjacent ends or borders can be connected to the respective profile plate panel 121 and 122 by means of a joint. Between the supporting stays 331b and across the longitudinal extension thereof or viewed in the longitudinal direction P-L, in each case a space 333 is formed. In the supporting stays 331a or in some of the supporting stays 331b at least one aperture 334 is provided. In one embodiment of the profile plate panel 110, 120 according to FIG. 16 in each of the supporting stays 331b at least one aperture 334 is present so that in this exemplary embodiment the fluid can flow between the profile plate panels 121, 122 in the longitudinal direction P-L through the interspaces which are connected to each other by the apertures 334. This embodiment of the reinforcing device 150 can, in particular, be applied in the embodiment of the flow body component 1 according to FIG. 35 for the purpose of forming the fluid channels 681, 682.

In an alternative embodiment, to the embodiment shown in FIG. 15, of the flow body component 1, the front profile plate portion 310 is designed in the same manner as in the embodiment shown in FIG. 7.

The embodiment, shown in FIG. 18, of the flow body component 1 according to the invention comprises a front profile plate portion 410 and the laterally adjoining sidewall profile plate portions 420-1, 420-2. The outer or first profile plate panels 411 or 421-1 or 421-2 and the inner or second profile plate panels 412 or 422-1 or 422-2 are designed so as to be permeable to fluid. The opposite ends of the front profile plate portion 410 or, as shown in FIG. 18, opposite locations 428-1, 428-2 or sections that extend in the spanwise direction are interconnected by a partition wall 485 to form a fluid channel 480a in the interior B of the flow body component 1 for removing fluid with the described functionality. Furthermore, the ends of the sidewall profile plate portions 420-1 or 420-2, which ends are situated opposite the front profile plate portion 410, are connected by a partition wall 485 to form a fluid channel 480b with the described functionality in the interior B of the flow body component 1. Thus, the embodiment of the flow body component 1 provides two fluid channels 480a, 480b. In this embodiment of the flow body component 1 a fluid flow can be caused by way of each of the fluid channels 480a, 480b and independently of each other in that location, either passively due to the prevailing pressure conditions in the fluid and/or actively by means of the pump, and thus fluid can be removed from the interior B of the flow body component 1. As an alternative, in the embodiment of the flow body component 1 according to FIG. 18 it is also possible to provide only one fluid channel that is formed by the partition wall 485 and the internal walls of the front profile plate portion 410 and of the sidewall profile plate portions 420-1 or 420-2. In this embodiment of the flow body component 1 the flow of the suction-extracted air in the fluid channel is caused passively because of the prevailing pressure conditions in the fluid and/or actively by means of the pump.

The reinforcing device 150 or 453 or 451 or 452 of the front profile plate portion 410 and/or of the laterally adjoining sidewall profile plate portions 420-1, 420-2 comprises a multitude of wall sections or supporting stays 471 or a supporting device that can be designed in various ways.

FIGS. 19 and 20 as an example show the embodiment of the supporting device that has been implemented in the second sidewall profile plate portion 420-2 and that is designated with the reference character 452. An identical supporting device has been implemented in the second sidewall profile plate portion 420-2. In this arrangement, as shown in FIG. 19 in conjunction with FIG. 20, the wall sections or supporting stays 471 are arranged in such a manner that their profile lines, in the plane defined by the longitudinal direction and the spanwise direction, of the sidewall profile plate portion 420-2 result in a honeycomb arrangement. Each honeycomb cell of this arrangement forms a profile plate chamber 472 whose honeycomb-shaped cross section results in the plane defined by the longitudinal direction P-L and the spanwise direction P-S. According to one embodiment of the supporting device 452, it is provided that some or all of the wall sections 471 are designed so as to be permeable to fluid. For this purpose the respective wall section 471 can comprise one or several apertures 473.

Figure 23:
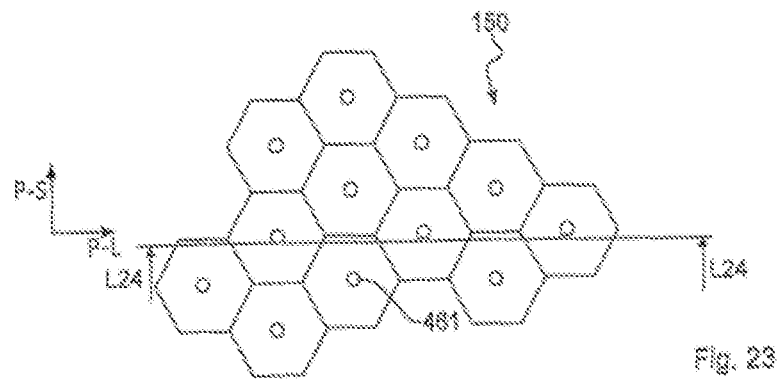
Figure 24:
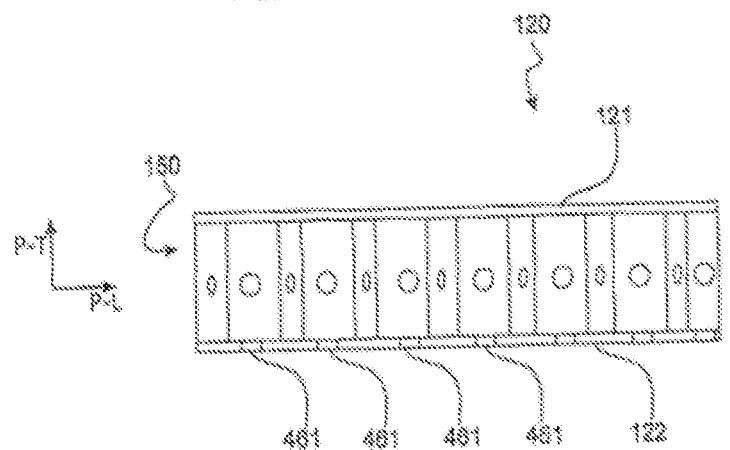

Furthermore, the respective inner or second profile plate panel 422-1 or 422-2 can comprise apertures 461 (FIGS. 23 and 24) so that fluid can flow from the outside A through the outer or first profile plate panel 421-1 or 421-2 into the honeycomb-shaped profile plate chambers 472 that are formed by the supporting device, and can flow out through the inner or second profile plate panel 422-1 or 422-2 and into the flow channel 480b.

As an alternative to the above it can be provided that the respective inner or second profile plate panel 422-1 or 422-2 is designed so as to be impermeable to fluid, and in this arrangement at least some of the wall sections 471 of the supporting device are designed so as to be permeable to fluid in such a manner that fluid that has flowed through the outer profile plate panel 421-1 or 421-2 into the profile plate chambers 472 between the respective outer and inner profile plate panel 421-1 or 422-1 and 421-1 or 421-2 can flow against, i.e. opposite to, the longitudinal direction P-L towards the front and into the fluid channel 480a. In this embodiment the fluid channel 480b does not form an essential part of the flow body component 1 for the fluid to be able to flow into the fluid channel 480a. However, in this arrangement it must be provided that at least fluid-permeable wall sections 471 of the supporting device are determined in number and position in such a manner that the throughflow of fluid between the respective outer and inner profile plate panels 421-1 or 422-1 and 421-1 or 421-2 into the fluid channel 480a is possible.

According to one embodiment, shown in FIGS. 21 and 22, according to the invention, the front profile plate portion 410 of the flow body component 1 also comprises a reinforcing device or a supporting device 453a with wall sections or supporting stays or reinforcing stays 471a, with the aforesaid being arranged in such a manner that their profile lines in the plane defined by the longitudinal direction and spanwise direction of the front profile plate portion 410 result in a honeycomb arrangement. Each honeycomb cell of this arrangement thus forms a profile plate chamber 472a whose honeycomb-shaped cross section results in the plane defined by the longitudinal direction P-L and spanwise direction P-S. When viewed in the plane defined by the longitudinal direction P-L and the spanwise direction P-S, within at least some of the honeycomb cells an aperture 461 (FIG. 24) in the inner profile plate panel 412 or 122 is provided so that fluid flowing into the front profile plate portion 410 through the outer or first profile plate panel 411 that is permeable to fluid can flow through the inner or second profile plate panel 412 from the front profile plate portion 410 and can flow into the fluid channel 480a or, if no partition wall 488 is present, into the shared fluid channel 480a and 480b.

In a preferred embodiment of such a front profile plate portion 410, wall sections or supporting stays or reinforcing stays 471a that extend across the longitudinal direction P-L are impermeable to fluid and are, for example, made without any apertures 473a. This results in connected wall sections 471a that are impermeable to fluid, which wall sections 471 together form a partition wall 477a. In this context the term "extending across the longitudinal direction P-L" preferably defines wall sections whose longitudinal directions encompass an angle greater than 45 degrees with the longitudinal direction P-L, wherein this angular definition relates to the smaller of the two vertical angles that arise when the longitudinal directions of the wall sections intersect the longitudinal direction P-L. In this arrangement the term "longitudinal directions of the plate-shaped wall sections" refers to the respective longitudinal extension of those profile cross-sectional areas of the plate-shaped wall sections, which profile cross-sectional areas in each case result as cross sections in a section plane defined by the longitudinal direction P-L and the spanwise direction P-S.

According to one embodiment of such a front profile plate portion 410, the partition wall 477a that is impermeable to fluid can extend over at least two honeycomb-shaped profile plate chambers 472a, and, together with a further partition wall 477a of this type that extends parallel to it and is impermeable to fluid, can form a profile plate chamber region 478a that extends across the longitudinal direction P-L. At the ends, in the spanwise direction P-S, said profile plate chamber region 478a can in each case be delimited by at least one wall section that is impermeable to fluid. Furthermore, the profile plate chamber region 478a can at least on one side in relation to the spanwise direction P-S be delimited by a sidewall of the front profile plate portion 410. Furthermore, the profile plate chamber region 478a in relation to both ends in relation to the spanwise direction P-S can be delimited by a sidewall of the front profile plate portion 410. As a result of the profile plate chamber regions 478a, formed by means of the partition walls, which profile plate chamber regions 478a extend in the spanwise direction P-S and at least in some sections extend across the longitudinal direction P-L, fluid can only flow in each case between two adjacent partition walls 477*a*, but cannot flow in the longitudinal direction P-L beyond the aforesaid.

As a result of the formation of profile plate chamber regions 478*a* in the front profile plate portion 410, control, which is advantageous in terms of suction-extraction of fluid from the flow present at the front profile plate portion 410, or impinging the aforesaid, of the fluid flow within the front profile plate portion 410 and thus efficient suction-extraction through the flow body component 1 overall is achieved.

For this purpose, as an alternative to the above-described embodiment, a further embodiment of the supporting device 453*a* can be implemented in the front profile plate portion 410, in which embodiment the profile plate chamber regions 478*a* through wall sections or supporting stays or reinforcing stays 471*a*, which profile plate chamber regions 478*a* extend across the spanwise direction P-S, are not designed so as to be permeable to fluid and are, for example, designed without any apertures 473*a*, extend over several profile plate chambers or honeycomb cells 472*a* in the longitudinal direction P-L, and at least in some sections extend across the spanwise direction P-S so that fluid cannot flow in the spanwise direction P-S in each case beyond two adjacent partition walls 477*a*. Depending on the application, it is possible also with a front profile plate portion 410 designed in this manner to achieve efficient suction-extraction of fluid from the outside A.

As an alternative to this, the front profile plate portion 410 of the flow body component 1 shown in FIG. 18 can comprise a reinforcing device 150 or 453*c* according to FIG. 26*a*. In this arrangement the wall sections or supporting stays or reinforcing stays 471*c* are designed in such a manner that a top view of a cross section of a section of a profile plate portion in the plane of the aforesaid, which plane is defined by the longitudinal direction and the spanwise direction, results in an arrangement of rectangular chambers 472*c*. In particular, the corners can be rounded in this manner, as shown in FIG. 26*a*, which is favourable in terms of fluid dynamics. In this arrangement the apertures in the wall sections or supporting stays 471*c* can be provided in the same manner as in the exemplary embodiment which is explained herein with reference to FIG. 21.

Figure 25:
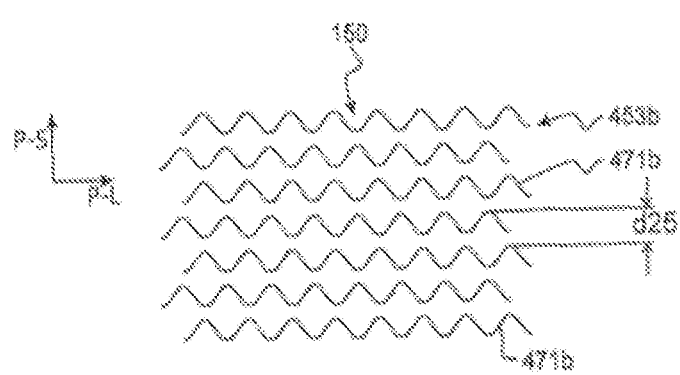
FIG. 25 is a diagrammatic top view of a cross section of a section of a profile plate portion according to the invention in the plane thereof defined by the longitudinal direction and the spanwise direction, wherein the reinforcing device comprises supporting walls which in the cross section shown result in an arrangement of rectangular chambers.

As an alternative to the above, the front profile plate portion 110 or 410 and/or a sidewall profile plate portion 120 in particular of the flow body component 1 shown in FIG. 18 can comprise a reinforcing device 150 or 453*b* according to FIG. 25. In this arrangement in each case wall sections or supporting stays or reinforcing stays 471*b* that are situated side by side are spaced apart from each other at a space d25 in such a manner that no chambers result. The reinforcing stays 471*b* are rigidly connected to the front profile plate panels 111, 112 or the sidewall profile plate panels 121, 122 between which they extend. These reinforcing stays 471*b* can be provided in all embodiments profile plate portions.

As an alternative, the front profile plate portion 410 of the flow body component 1 shown in FIG. 18 can comprise a reinforcing device 150 or 453*c* according to FIGS. 26*a* and 26*b*. In this arrangement the wall sections or supporting stays 471*c* are designed in such a manner that a top view of a cross section of a section of a profile plate portion in the plane of the aforesaid, which plane is defined by the longitudinal direction and the spanwise direction, results in a scale-like arrangement of chambers (e.g., FIG. 26*a*) or in an arrangement of droplet-shaped chambers 472*d* (e.g., FIG. 26*b*). In this embodiment, too, in the cross section shown there are no corners; instead, the walls are rounded at each position, which is favourable in terms of fluid dynamics. In this arrangement the apertures in the wall sections or supporting stays 471*d* can be provided in the same manner as in the exemplary embodiment which is explained herein with reference to FIG. 21.

With reference to FIGS. 19 to 26 it is shown that at least in some sections supporting stays 331*a*, 331*b*, 471*b*, 471*c*, 471*d* extend across a longitudinal direction P-L and along the spanwise direction P-S of the profile plate portion 120 along each other, which supporting stays 331*a*, 331*b*, 471*b*, 471*c*, 471*d* in a cross-sectional plane that extends along the longitudinal extension of the profile plate portion 120 are curved or are formed from wall sections that extend at an angle to each other and that adjoin each other.

Figure 27:
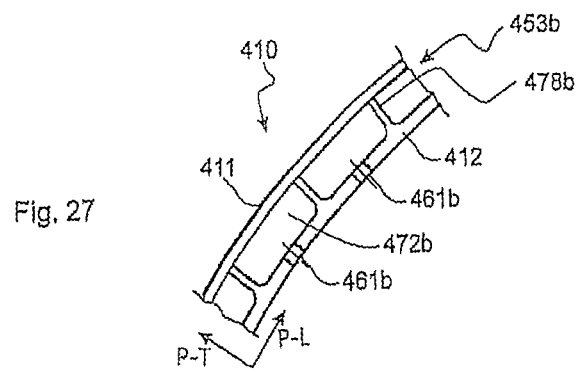

According to a further alternative, the front profile plate portion 410 of the flow body component 1 shown in FIG. 18 can comprise a reinforcing device 150 according to FIG. 27. In this arrangement the wall sections or supporting stays extend in the spanwise direction P-S of the front profile plate portion 410 so that between these, too, profile plate chambers form that extend in the spanwise direction P-S.

In particular, several profile plate chambers that are situated side by side in the spanwise direction P-S can form a profile plate chamber region 478*b* if the corresponding wall sections or supporting stays, which extend across the spanwise direction P-S and which are situated within the profile plate chamber region, are impermeable to fluid. The profile plate chamber regions can in each case at the ends in the spanwise direction P-S be delimited by at least one wall section that is impermeable to fluid. Furthermore, the profile plate chamber region 478*b* can, at least on one side, in relation to the spanwise direction P-S be delimited by a sidewall of the front profile plate portion 410. Furthermore, in relation to both ends in relation to the spanwise direction P-S, the profile plate chamber region can be delimited by a sidewall of the front profile plate portion 410. As a result of this arrangement of wall sections or supporting stays the profile plate chambers or profile plate chamber regions are formed so as to be essentially rectangular.

As a result of the profile plate chambers or profile plate chamber regions, formed by means of the partition walls, which profile plate chambers or profile plate chamber regions extend in the spanwise direction P-S and extend at least in some sections across the longitudinal direction P-L, fluid can only flow in each case between two adjacent wall sections that extend in the spanwise direction P-S, but cannot flow in the longitudinal direction P-L beyond the aforesaid. By way of apertures 461*b* in the inner or second profile plate panel 412, fluid can flow from the outside A to the inside B.

As an alternative to the described embodiment according to FIG. 25 the aforesaid can also be implemented in a modified manner such that the wall sections or supporting stays extend in the longitudinal direction P-L of the front profile plate portion 410 so that, between the aforesaid, profile plate chambers form that also extend in the longitudinal direction P-L. As a result of these wall sections or supporting stays that extend in the longitudinal direction P-L, profile plate chambers or profile plate chamber regions form which extend in the longitudinal direction P-L and at least in some sections extend across the spanwise direction P-S, fluid can only flow in each case between two adjacent wall sections that extend in the longitudinal direction P-L, but cannot flow in the spanwise direction P-S beyond the aforesaid. By way of apertures in the inner or second profile plate panel 412, fluid can flow from the outside A to the inside B.

Figure 28:
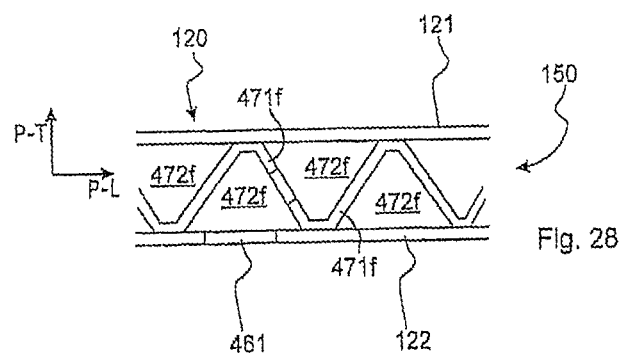

As an alternative the front profile plate portion 410 of the flow body component 1 shown in FIG. 18 can comprise a reinforcing device 150 according to FIG. 28. In this arrangement the reinforcing device 150 is designed in such a manner that its wall sections or supporting stays 471e in the plane of the profile plate portion, which plane is defined by the longitudinal direction and the thickness direction, form a framework together with the profile plate panels 121, 122. Between the supporting stays and the respective profile plate panels 121, 122, profile plate chambers form which in their width are delimited by the supporting stays and which, like the aforesaid, longitudinally extend along the spanwise direction P-S.

Advantageously, the profile plate chambers can, in particular, comprise a maximum width, when viewed in the spanwise direction P-S of the flow body component, of between 0.3% and 0.6% of the profile depth PT of the flow body at this position at which the respective flow body component is arranged.

Furthermore, advantageously, the profile plate chambers can, in particular, comprise a maximum length, when viewed in the longitudinal direction P-L of the flow body component, of between 0.3% and 3% of the profile depth PT of the flow body at this position at which the respective flow body component is arranged.

According to the embodiment of the profile plate portion 120 according to FIG. 28, the front profile plate portion 410 and/or each of the sidewall profile plate portions 220-1, 220-2 of the embodiment of the flow body component 1 can be formed according to FIG. 18.

The reinforcing device of the front profile plate portion 410 or of the laterally adjoining sidewall profile plate portions 420-1, 420-2 can in each case also be designed in some other manner.

The outer or first profile plate panels 411 and 421-1 or 421-2 of the front profile plate portion 410 or of the laterally adjoining sidewall profile plate portions 420-1, 420-2 are designed so as to be impermeable to fluid.

According to one embodiment of the outer or first profile plate panels 411 and 421-1 or 421-2, the aforesaid comprise mesh or a mesh arrangement 140 of at least one mesh layer 141 in particular comprising metal, as has been described with reference to FIGS. 13 and 14.

Figure 32A:
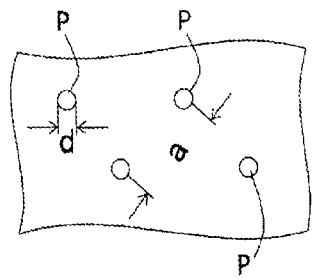
FIGS. 32a and 32b are the pressure gradients in the profile plate chamber according to FIG. 31, FIGS. 33a and 33b are cross sections of a profile plate chamber, formed by a reinforcing device, viewed in the plane defined by the longitudinal direction and the thickness direction of the profile plate portion, with the fluid pressure present on the outer or first profile plate panel of the profile plate portion being shown, wherein the first profile plate panel of the profile plate portion is designed according to a further or third embodiment, FIG. 34 a cross-sectional view of a further embodiment of the flow body component according to the invention, FIG. 35 a cross-sectional view of a further embodiment of the flow body component according to the invention, FIG. 36 a cross-sectional view of a first embodiment of the front profile plate portion according to the embodiment of the flow body component according to FIG. 34 or 35, FIG. 37 a cross-sectional view of a second embodiment of the front profile plate portion according to the embodiment of the flow body component according to FIG. 33a, 33b or 34, FIG. 38a a cross-sectional view of a third embodiment of the front profile plate portion according to the embodiment of the flow body component according to FIG. 34 or 35, FIG. 38b a section of the illustration in FIG. 37, FIG. 38c a further section of the illustration in FIG. 37, FIG. 39 a cross-sectional view of a further embodiment of the flow body component according to the invention, FIG. 40a a cross section of a first step of one embodiment of a method according to the invention for connecting two panels to supporting stays.
Figure 32B:
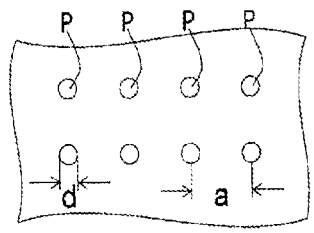

According to one alternative embodiment of the outer or first profile plate panels 411 and 421-1 or 421-2, the aforesaid are designed as microperforated panels, i.e. these panels comprise microperforations P. In the embodiments according to FIG. 18 and also in other embodiments according to the invention, the diameter d (FIGS. 32a, 32b) or the widest width of the microperforations P from the outer or first profile plate panels 210 with microperforations P is between 30 μm and 100 μm. According to preferred embodiments of the invention, the inner profile plate panels that comprise apertures 261, 461, in contrast to the above, do not comprise microperforations P, i.e. they have a diameter or a maximum width exceeding 100 μm. The space a (FIGS. 32a, 32b) of the microperforations P from each other in the associated outer profile plate panel 211 or 311 or 411 of the front profile plate portion 210 or 310 or 410 or in a sidewall profile plate portion can, in particular, be 0.15% and 0.5% of the profile depth PT of the flow body at this position at which the respective flow body component is arranged. As an alternative or in addition, the space a of the microperforations P from each other within a profile plate chamber delimited by wall sections can amount to between four times and ten times the diameter d (FIGS. 32a, 32b) or between four times and ten times the maximum width of the microperforations P.

According to one embodiment of the flow body component 1 according to the invention, in one embodiment of the sidewall profile plate portions 220-1, 220-2 or 320-1, 320-2 or 420-1, 420-2, which embodiment comprises outer or first profile plate panels 221-1, 221-2 or 321-1, 321-2 or 421-1, 421-2 with microperforations, the space between the microperforations in the associated outer profile plate panel along the longitudinal direction P-L is constant at least within a profile plate chamber delimited by wall sections, and in particular over the entire length in the longitudinal direction P-L of the sidewall profile plate portion.

The above, generally speaking, applies to such flow body components 1 according to the invention. The aforesaid applies in particular to embodiments of the profile plate portions 120 with a reinforcing device 150 with wall sections 471 and the profile plate chambers 472 according to FIG. 19, with wall sections and the profile plate chambers according to FIG. 25, with wall sections 471d and the profile plate chambers 472d according to FIG. 26b, or with wall sections 471f and the profile plate chambers 472f according to FIG. 28.

As an alternative or in addition, according to one embodiment of the flow body component 1 according to the invention with front profile plate portions 210 or 310 or 410 that comprise outer or first profile plate panels 211 or 311 or 411 with microperforations P, it is provided that the space a (FIGS. 32a, 32b) of the microperforations P from each other in the associated outer profile plate panel 211 or 311 or 411 of the front profile plate portion 210 or 310 or 410 within a profile plate chamber delimited by wall sections is variable along the longitudinal direction P-L. The first profile plate panel 121 of the leading edge profile plate portion 110 can comprise microperforations whose distribution density and/or size of the microperforations in the respective outer panel in the region in each case within a profile plate chamber 472, 472a, 472c, 472d, 472f increases in a longitudinal direction P-L of the profile plate portion 120. In this region in each case of a profile plate chamber, in particular, 20 to 50 microperforations can have been made in the respective outer profile plate panel.

The increase in the distribution density of the microperforations in the region in each case of a profile plate chamber can be achieved by a reduction of the smallest space between respective adjacent microperforations from the rearmost microperforations in relation to the longitudinal direction P-L of the profile plate portion 120 vis-à-vis the space between respectively frontmost microperforations by a factor of 1.5 to 3.5. As an alternative or in addition, an increase in the distribution density of the microperforations in the region in each case of a profile plate chamber by a factor of 1.5 to 3.5 can be provided in relation to the distribution density of the microperforations in the rearmost third, in terms of area, of said region in each case of a profile plate chamber in relation to the distribution density of the microperforations in the rearmost third, in terms of area, of said region in each case of a profile plate chamber. In this arrangement the terms "front" and "rear" is defined by the direction of the longitudinal direction P-L of the profile plate portion 120 or of the flow body on which the flow body component 1 with the respective profile plate portion 120 is arranged.

The described variability of the perforation size and perforation distribution density within a chamber can, generally speaking, be applied to such flow body components 1 according to the invention. This applies, in particular, to embodiments of profile plate portions 120 with a reinforcing device 150 with wall sections 471a and the profile plate chambers 472*a* according to FIG. 21, with wall sections 471*c* and the profile plate chambers 472*c* according to FIG. 26*a*, with wall sections 471*d* and the profile plate chambers 472*d* according to FIG. 26*b*, with wall sections 471*b* and the profile plate chambers 472*b* according to FIG. 27, or with wall sections 471*f* and the profile plate chambers 472*f* according to FIG. 28.

Figure 29:
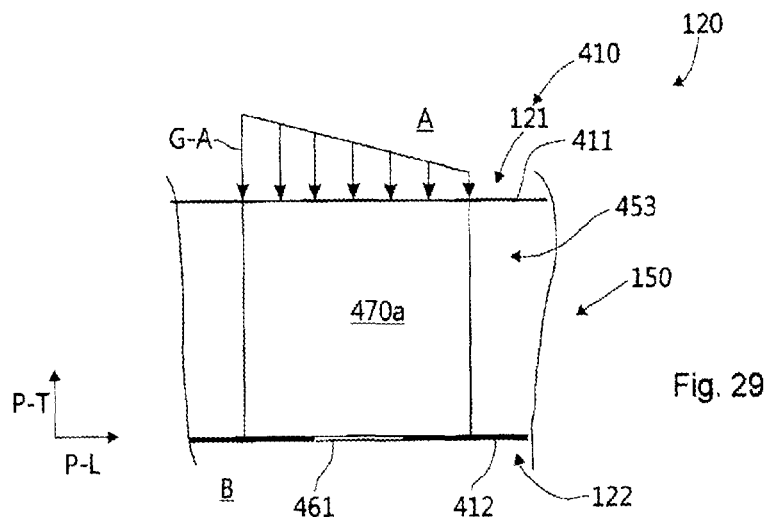
Figure 30:
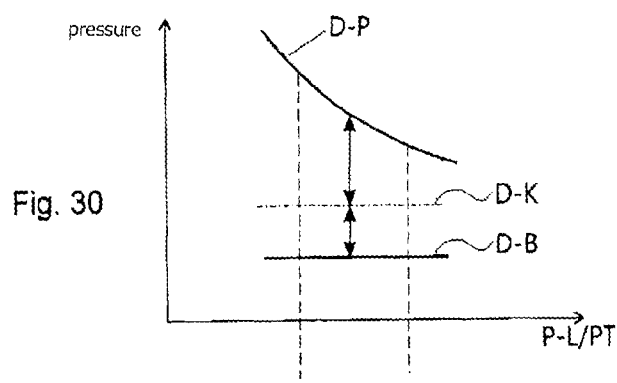
Figure 31:
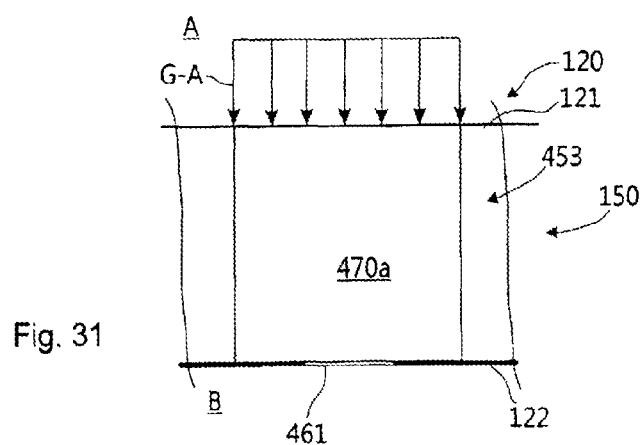

Below, the above is explained with reference to the profile plate chamber 472*a* according to FIG. 21. According to the invention a situation is to be achieved in which at each position of the flow body component 1 along the longitudinal direction P-L fluid, and in particular air, is suction-extracted through the microperforations P. In the region of the longitudinal extension P-L of a profile plate chamber this then results in a speed profile of the fluid suction-extraction speed G-A according to FIG. 29, which speed profile shows that along the longitudinal direction P-L over the entire length of the profile plate chamber 470*a* fluid enters into the profile plate chamber 470*a* through the microperforations P (not shown in FIG. 29) that are present in the panel 411. This speed profile results from the pressure conditions on the panel, which pressure conditions are shown in FIG. 30. Curve D-P shows the gradient of the pressure in the longitudinal direction P-L in the region of a profile plate chamber (for example of the profile plate chamber 470*a*), which gradient shows a pressure which due to the profile curvature existing in the region of the respective front profile plate portion 210 or 310 or 410 is reduced in the profile plate longitudinal direction P-L. The abscissa shows the longitudinal extension P-L in relation to the profile depth PT of the respective flow body. The curve D-K shows the pressure gradient present in the chamber 470*a* along the profile plate longitudinal direction P-L, which pressure gradient shows pressure that is constant over the profile plate longitudinal direction P-L. The curve D-B shows the pressure gradient present in the interior B or in a flow channel leading along the inner profile plate panel (for example channels 783, 784 in FIG. 39) in the region of the chamber 470*a* along the profile plate longitudinal direction P-L, which gradient shows pressure that is constant over the profile plate longitudinal direction P-L. FIG. 31 shows an ideal profile of the fluid suction-extraction speed G-A over the longitudinal extension P-L of a profile plate chamber in which the fluid suction-extraction speed G-A is constant over the longitudinal extension P-L.

Figure 33A:
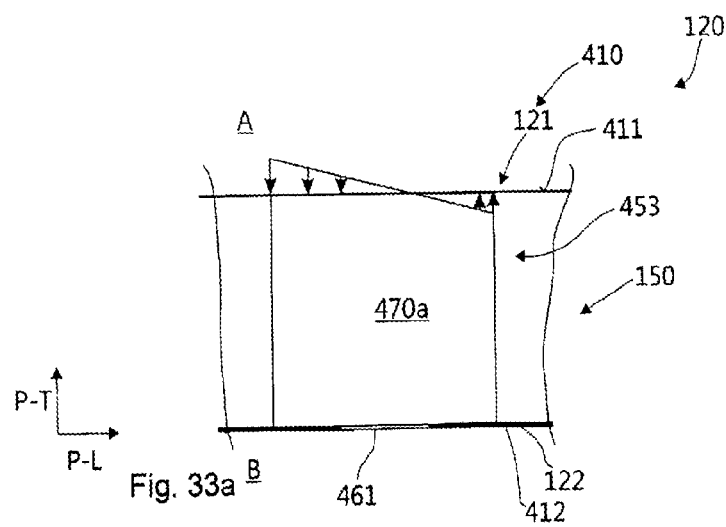
Figure 33B:
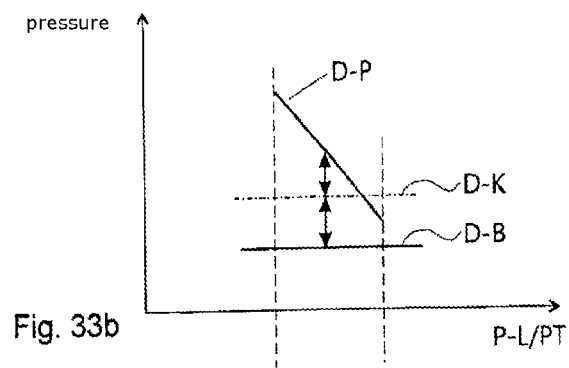

The profile of the fluid suction-extraction speed G-A over the longitudinal extension P-L of a profile plate chamber and the pressure gradient present therein, which are shown in FIGS. 33*a* and 33*b* is to be avoided. In this arrangement an outflow of fluid from the profile plate chamber in the rear region of the aforesaid occurs.

Below, with reference to the embodiments of the flow body component 1 according to FIGS. 34, 35 and 39, in particular, further embodiments of the front profile plate portion 510, 610 or 710 are described.

Figure 34:
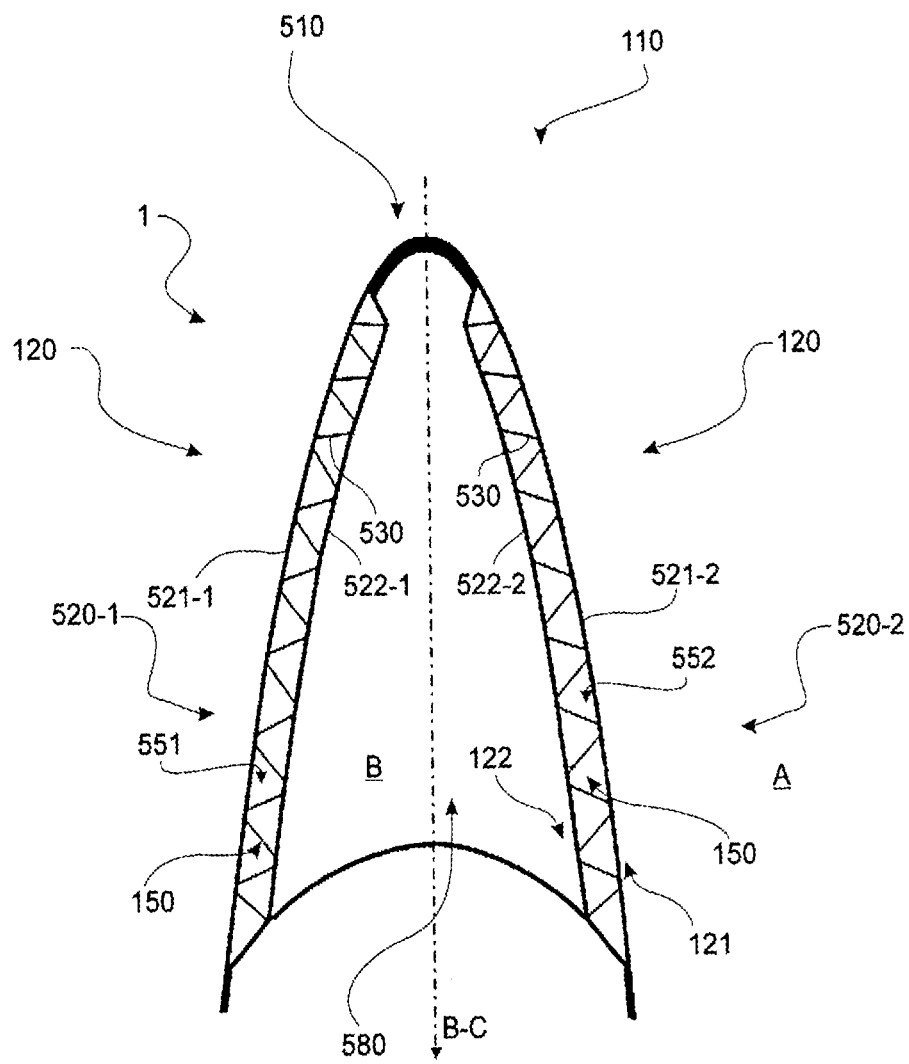

FIG. 34 shows one embodiment of the flow body component 1 according to the invention in the application as a leading edge body 23 of a vertical stabiliser. The front profile plate portion 510 and laterally adjoining sidewall profile plate portions 520-1, 520-2 extend along each other. Both the front profile plate portion 510 and the sidewall profile plate portions 520-1, 520-2 are in each case formed as a profile plate portion 120. The front profile plate portion 510 and the laterally adjoining sidewall profile plate portions 520-1, 520-2 in each case comprise an outer or first outer profile plate panel 521-1 or 521-2 and a second, inner, profile plate panel 522-1 or 522-2 as well as an intermediate layer 551 or 552, situated between the respective first and second profile plate panels, which intermediate layer 551 or 552 preferably comprises metal foam. In this arrangement the outer or first outer profile plate panels 521-1 or 521-2 generally speaking are the panels situated on the outside of the respective flow body component, in other words those panels that are subjected to the flow around the flow body component.

A partition wall defines a fluid channel 580 in the interior B of the flow body component 1. The reinforcing device is formed by supporting carriers 530 which extend across a longitudinal direction P-L of the respective profile plate portion 120 along each other.

Figure 35:
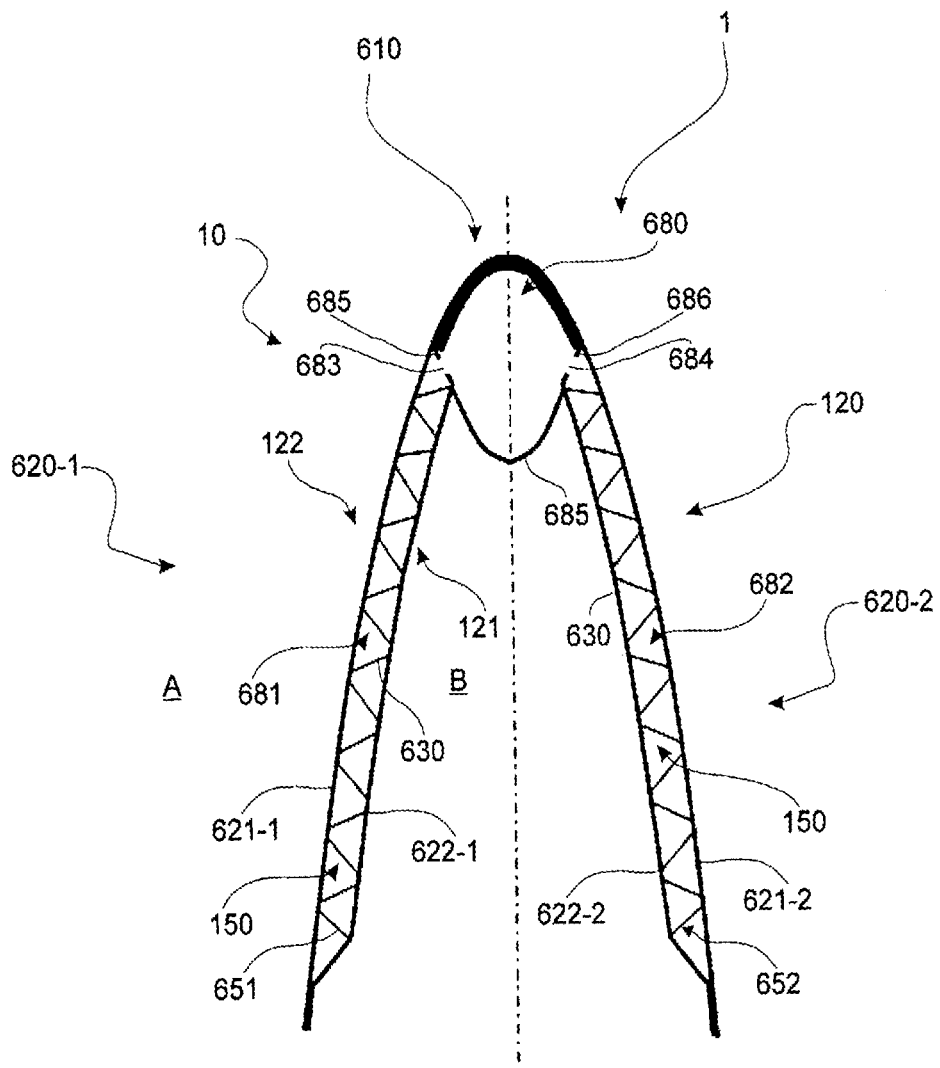

Likewise, FIG. 35 shows one embodiment of the flow body component 1 according to the invention in the application as a leading edge body 23 of a vertical stabiliser. The front profile plate portion 610 and laterally adjoining sidewall profile plate portions 620-1, 620-2 that extend along each other are provided. Both the front profile plate portion 610 and the sidewall profile plate portions 620-1, 620-2 are in each case formed as a profile plate portion 120. The reinforcing device is formed by supporting carriers 630 which extend across a longitudinal direction P-L of the respective profile plate portion 120 along each other.

Figure 39:
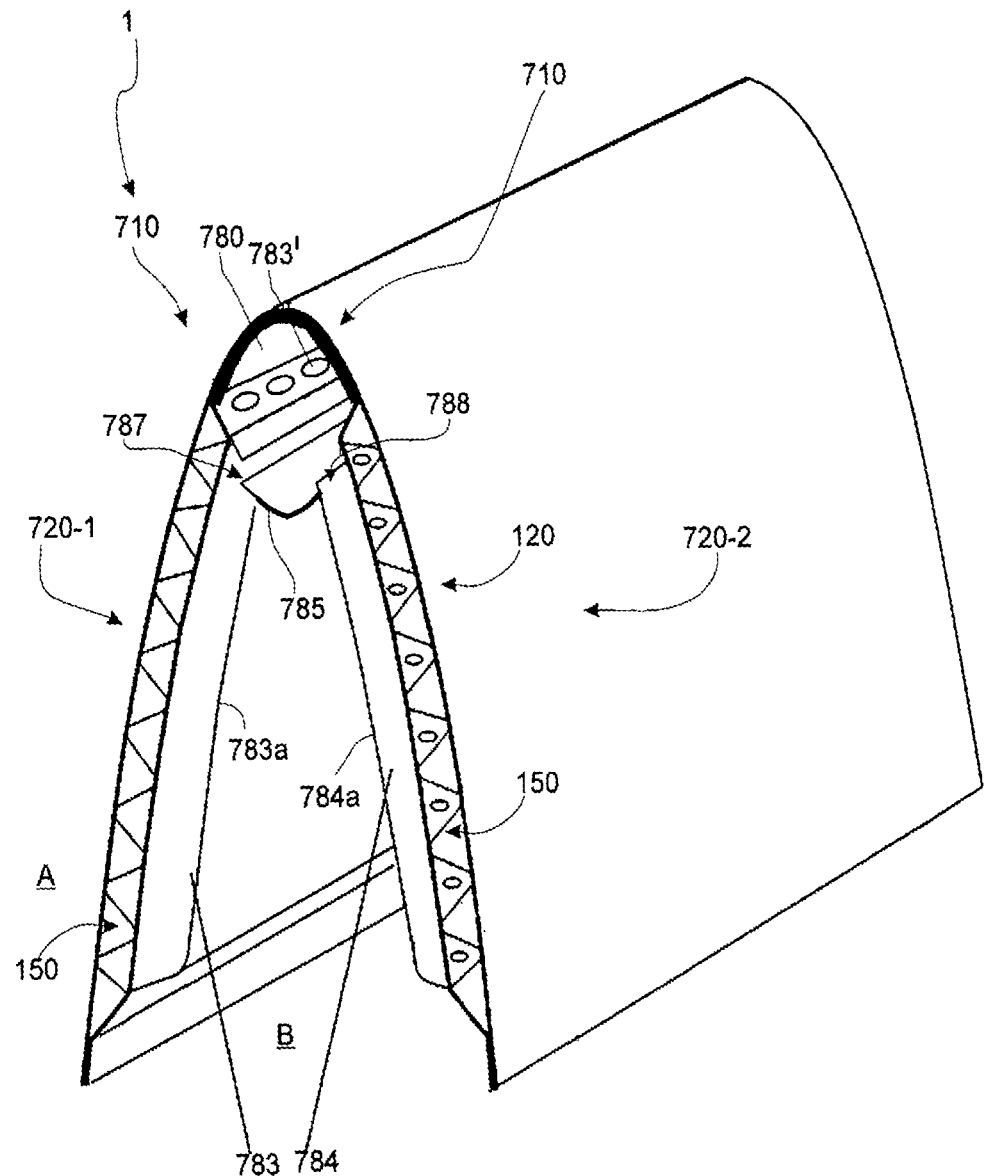
Figure 40A:
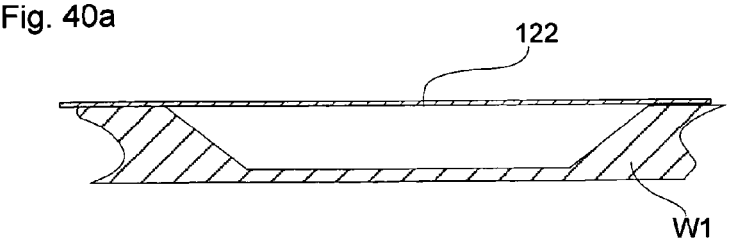
Figure 40B:
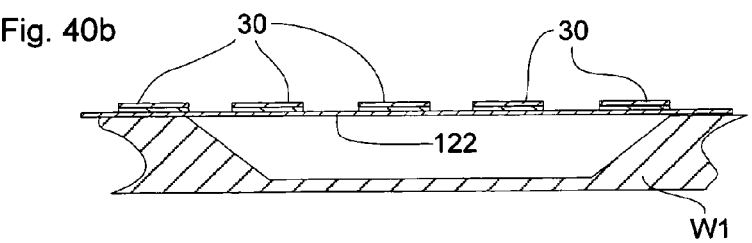
Figure 40C:
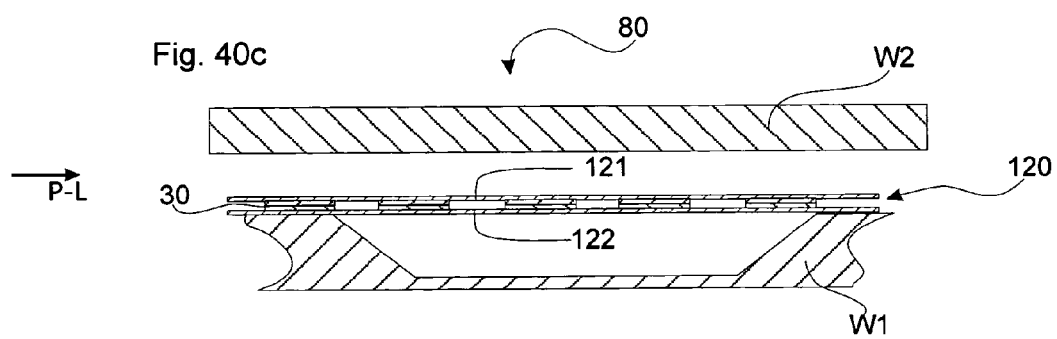
FIG. 40c a cross section of a third step of the embodiment of a method according to the invention according to FIG. 40b.
Figure 40D:
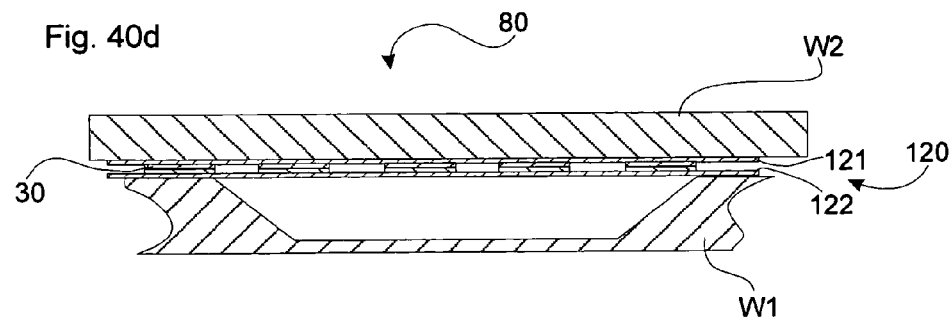
FIG. 40d a cross section of a fourth step of the embodiment of a method according to the invention according to FIG. 40c.

Furthermore, FIG. 39 also shows one embodiment of the flow body component 1 according to the invention in the application as a leading edge body 23 of a vertical stabiliser. The front profile plate portion 710 and laterally adjoining sidewall profile plate portions 720-1, 720-2 are provided. In each case, both the front profile plate portion 710 and the sidewall profile plate portions 720-1, 720-2 are formed as a profile plate portion 120.

The front profile plate portion 510, 610, 710 can, in particular, be designed according to FIG. 36, 37 or 38*a* to 38*c*, in which the front profile plate portion is designated with the reference character 110.

According to FIG. 36 the front profile plate portion comprises foam layer bodies or foam blocks and, in particular, open-pore metal foam layer bodies 116 which extend in the spanwise direction B-S, and are separate from partition walls or supporting carriers 117 that extend in the spanwise direction B-S, which partition walls or supporting carriers 117 are attached as supporting walls to the panels 111, 112. The partition walls 117 are designed so as to be impermeable to fluid, as has been described, for example, with reference to FIGS. 21, 27 in conjunction with FIGS. 29 to 31. In this arrangement it can, in particular, be provided that supporting carriers 117 extend in a spanwise direction P-S of the profile plate portion 120, which supporting carriers 117 are attached to the first profile plate panel 111 and the second profile plate panel 112. In this arrangement, at least in some of the spaces, and in particular in all spaces, of a profile plate portion 110, 120, which spaces form in each case between two adjacent supporting carriers 117, it can be provided that at least one open-pore metal foam layer body 116 can be received in such a manner that fluid flowing through the first profile plate panel 111 flows through the open-pore metal foam layer body 116. In particular, in this arrangement the open-pore metal foam layer body 116 can rest flat against the respective supporting carriers 117, between which in each case a metal foam layer body 116 is situated.

According to the invention these embodiments and variants with supporting carriers 117 and with foam layer bodies situated between the aforesaid can generally speaking be provided for profile plate portions that comprise a foam layer, for example for the embodiments according to FIG. 7.

The foam layer bodies 116 can, in particular, be connected in a sintering furnace to the panels 11, 112 and/or to the supporting carriers 117.

According to FIG. 37 the front profile plate portion 110 comprises a reinforcing device 150 made of supporting walls 118 that extend in the spanwise direction B-S, which supporting walls 118 are attached to the panels 111, 112. On a first end 118a the supporting walls 118 are welded to the outer panel 111. To this effect, at the position provided for the welded connection the outer panel 111 can comprise an increased panel thickness. In this manner it is possible to ensure that the outside of the outer panel 111, which is a flow surface, does not comprise any unfavourable indentations which would represent deviations from an aerodynamically favourable profile shape. For the purpose of attaching the second end of the supporting walls 118, the latter comprise an arch-shaped curvature section to form a base 118b by means of which flat outside the respective supporting wall can be soldered or welded to the inner panel 112.

The method for manufacturing the profile plate portion 110 with reinforcing stays 118 that extend in the lateral direction P-L of the profile plate provides that for at least some of the reinforcing stays a cross-sectional profile is used with a straight end section (which forms the main stay section) at a first profile end and a curved end section on the second cross-sectional profile-end, which is situated opposite the first cross-sectional profile-end, wherein the curved end section is designed as a base 118b that provides a supporting surface on the underside 118c of the base. The method comprises, in particular, the following steps:

connecting the first profile plate panel 111 to the first profile ends of a multitude of reinforcing stays,
connecting the second profile plate panel 112 to the bases of the reinforcing stays.

In this arrangement, connecting the second profile plate panel 112 to the bases of the reinforcing stays can take place by:

placing the second profile plate panel 112, 122 onto the supporting surfaces of the bases of the reinforcing stays, which supporting surfaces are situated on the underside of the bases,
welding, by means of laser beam welding technology, the bases of the reinforcing stays from that side that is situated outside the profile plate portion 110, 120 and on the second profile plate panel 112, 122.

As an alternative to the above, connecting the second profile plate panel 112 to the bases of the reinforcing stays can take place by:

applying a soldering agent onto the underside of the bases of the reinforcing stays,
placing the second profile plate panel 112 onto the supporting surfaces of the bases of the reinforcing stays, which supporting surfaces are situated on the underside of the bases,
soldering, by means of soldering technology, the bases of the reinforcing stays from that side that is situated outside the profile plate portion 110 and on the second profile plate panel 112.

The embodiments of the flow body component 1 according to FIGS. 34, 35, 39 show various forms of implementing the removal of fluid from the outside A to the inside B.

FIG. 35 shows an alternative embodiment, when compared to that of FIGS. 7, 15, 33, of guiding the fluid in the flow body component 1 according to the invention. In this arrangement the reinforcing devices 150 or 652 of the sidewall profile plate portions 620-1 or 620-2 within the profile plate panels 621-1 or 621-2 can be designed so as to be permeable to fluid, and the inner or second profile plate panels 622-1 or 622-2 can be designed so as to be impermeable to fluid, wherein apertures 683 and 684 are provided in the respective partition wall 685 or 686 of the fluid channel 680. Since the supporting stays or reinforcing plates 630 are designed so as to be permeable to fluid, the spaces within the profile plate panels 621-1 and 622-1 or 621-2 and 622-2 in each case form fluid channels 681 or 682. In this manner the fluid flowing from the outside A of the flow body component 1 through the outer or first profile plate panels 621-1 or 621-2 can flow within the sidewall profile plate portions 620-1, 620-2 and through the reinforcing devices 651, 652 against, i.e. opposite to, the outer direction of flow towards the front and through apertures 683 or 684 in a connecting wall 685 or 686 into the fluid channel or outflow channel 680. In each case the partition wall 685 or 686 is a wall that separates the sidewall profile plate portions 620-1 or 620-2 from the fluid channel 680; it can form part of the partition wall 685. However, it is also possible to make do without the partition walls 685 or 686.

Generally speaking, and also in this embodiment as described, the removal of fluid can take place either passively, or actively by means of a pump.

As provided in the embodiment according to FIG. 39, the apertures 683, 684 can be an arrangement of apertures 783' in a partition wall 785 between sidewall profile plate portions 720-1 or 720-2 and the fluid channel 780. In the embodiment according to FIG. 39 the fluid channel 780 is separated from the interior B by means of the partition wall 785. In addition, this embodiment comprises an additional profile plate channel 783, 784, which is optionally provided according to the invention, which profile plate channel 783, 784 in each case results because of channel walls that extend spaced apart at least in some sections along the inner or second profile plate panels 222-1 or 222-2 that are permeable to fluid, between the second profile plate panels 222-1 or 222-2 and the channel walls 783a or 784a. In each case these additional profile plate channels 783, 784 lead through apertures 787 or 788 into the fluid channel 780.

Generally speaking, and also in this embodiment as described, the removal of fluid can take place either passively, or actively by means of a pump.

Generally speaking, in particular with reference to the embodiments of FIGS. 34, 35, 39, the flow body component 1 can comprise a suction-extraction device for fluid that comprises a flow channel 580, 680, 780, located in the interior of the flow body component 1, which flow channel 580, 680, 780 at least in some sections is delimited by the second front profile plate portion that is permeable to fluid, and comprises a pump, connected to the flow channel 580, 680, 780 for suction-extraction through the flow channel of fluid flowing through the front of the flow body 110.

As an alternative to the above, in particular with reference to the embodiments of FIGS. 34, 35, 39, the flow channel 580, 680, 780 can comprise an aperture into the interior of the flow body component 1 and/or an outlet from the interior of the flow body component 1, wherein said flow channel 580, 680, 780 is guided in the flow body component 1 in such a manner that, during incident flow of the flow body component 1 as intended, suction-extraction of the fluid flowing through the front of the flow body 110 takes place through the flow channel 580, 680, 780.

These embodiments result in a flow, in particular in the channels 580, 680, 780, along the spanwise direction of the flow body component 1 and in the suction-extraction of fluid from the outside A.

In the embodiments of FIGS. 35 and 39 the cross section of the central fluid channel 680 or 780 is significantly smaller than, for example, in the embodiment of FIG. 3. Depending on the particular application, the latter embodiment may be more favourable. Furthermore, in this design an installation space between the profile plate portions 620-1, 620-2 or 720-1, 720-2 or sidewall sections is made available, which installation space can, for example, be used for accommodating cables or hydraulic lines.

Below, a manufacturing method for the manufacture of a profile plate portion 120 and in particular of a sidewall profile plate portion is described, which profile plate portion 120 and in particular sidewall profile plate portion can, in particular, be described according to FIG. 16, 17, 28, 34, 35 or 39, and which profile plate portion 120 and in particular sidewall profile plate portion between panels 121, 122 comprises supporting stays as a reinforcing device, which supporting stays are connected to said panels 121, 122.

The profile plate portion 120 is designed according to one of the embodiments described herein. The outer or first profile plate panel 121 is designed so as to be permeable to fluid and in this arrangement can be a panel comprising apertures, a panel comprising microperforations P or, in particular, it can be made completely from mesh or a mesh arrangement and, in particular, a metal mesh arrangement as described with reference to FIGS. 13 and 14.

By means of the method-related steps described with reference to FIGS. 40a to 40d and 41a to 41d, in particular, a profile plate portion 120 according to FIG. 16 can be manufactured. By means of the method-related steps described with reference to FIGS. 40a to 40d and 42a to 42c, in particular, a profile plate portion 120 according to FIG. 17 can be manufactured. The profile plate portion 120 according to FIG. 16 and also according to FIG. 17 comprises an outer or first profile plate panel 121, which is permeable to fluid, and, depending on the embodiment of the flow body component 1 to be manufactured, comprises an inner or second profile plate panel 122, which is permeable to fluid or impermeable to fluid.

The method according to the invention is thus used for manufacturing a profile plate portion 120 for use as an outer wall of a flow body 110, the profile plate portion 120 comprising a first profile plate panel 121 and a second profile plate panel 122 and a reinforcing device 330 in the form of stay plates 231a or 231b, which reinforcing device 330 supports the aforesaid on one another, wherein at least the first profile plate panel 121 is designed so as to be permeable to fluid.

The stay plates can be designed to comprise a single component or multiple components and, in particular, two components. In the design of the reinforcing device 150 according to FIG. 16 the stay plates have been formed by means of two stay plate components 31, 32 which in the finished state of the profile plate portion 120 in the thickness direction of the profile plate portion 120 with their width extension are situated one behind the other and are interconnected by means of a diffusion weld seam 35a. Furthermore, the stay plate components 31, 32 are at the borders or border sections that extend in the spanwise direction P-S, which in each case are situated opposite the interconnected borders, also connected by means of a diffusion weld seam 33a or 34a to the first profile plate panel 121 or to the second profile plate panel 122 (FIGS. 41c, 41d).

In the embodiment of the reinforcing device 150 according to FIG. 17 the stay plates 331b in one arrangement are situated in such a manner within the first profile plate panel 121 and the second profile plate panel 122 and connected to the aforesaid that the aforesaid in the cross section in the plane defined by the chord direction P-T and the thickness direction P-T allows a framework-like arrangement of the stay plates 331b. In this case borders or border sections, which are positioned adjacent to each other, are connected to each other by a diffusion weld seam 35b and are connected to the respective 121 and 122 by a diffusion weld seam 35b (FIGS. 42b, 42c).

By means of diffusion welding, connecting border regions of the stay plates 331b or 331a, 31, 32 takes place in the manner described, while the stay plates or stay plate components 31, 32 are placed so as to be flat between a first profile plate panel 121 and a second profile plate panel 122. In a superplastic deformation step the stay plates 331b or the stay plate components 31, 32, by being raised, are moved to the intended position in the profile plate portion 120 while the profile plate panels 121 or 122 in the tool with the tool components W1, W2 are moved apart.

In these profile plate portions the stay plates 331b extend in their longitudinal direction along the longitudinal direction P-L of the profile plate portion 120, and their width direction at an angle to the chord direction P-T of the hollow chamber profile 120. The stay plates 331a, which are designed as framework profiles, at their ends situated in relation to their width, at joint regions 35 are connected to the inner or second profile plate panel 122 or the outer or first profile plate panel 121, wherein ends of two respectively adjacent framework profiles are preferably attached to the same mounting region 35a to the second profile plate panel 122 or to the top cover shell. As an alternative, the ends of two respectively adjacent framework profiles can also be connected, at various mounting regions 35 that are spaced apart from each other, to the first profile plate panel 121 or to the second profile plate panel 122, wherein the width of the mounting regions 35 is then preferably at most three to five times the thickness of the framework profiles. This correlation also applies to the width of the mounting regions 35 in the case of perpendicular stays as reinforcing elements 30, as shown in FIGS. 16 and 17. In this arrangement the longitudinal directions of the framework profiles 30 extend along each other. The arrangement of the framework profiles 30 at least in a section of the hollow chamber profile 10 is preferably designed in such a manner that the respective acute angle between the width direction of the framework profiles 30 and the longitudinal extension of the second profile plate panel 122 or of the top cover shell ranges from 10 degrees to 90 degrees.

FIG. 16 or 17 shows that in the first step of the method according to the invention it is not mandatory to provide a deformation step, for example superplastic deformation after connecting. Instead, it is also possible, as shown in FIG. 2, for the reinforcing elements or stay plates 331a to be rigid and dimensionally stable elements that immediately after being arranged on the bottom or inner profile plate panel 122 are already in their final shape. In this final shape the stay plates 331a or 331b are used as supports for the two profile plate panels 121 and 122 on one another. By forming a force connection path between the two profile plate panels 121 and 122 the aforesaid are supported on one another and moreover their desired space is defined. In this arrangement said space can be constant or it can vary over the geometric characteristics of the hollow chamber profile 10. In such an embodiment the connections between the stay plates 331a or 331b and the two profile plate panels 121 and 122 are established by means of relatively simple connection methods, for example by means of soldering, diffusion welding or bonding.

The superplastic deformation step with the use of overpressure between the two profile plate panels 121 and 122 is significantly supported in that in the stay plates 331a or 331b apertures 334 are provided in the reinforcing elements 30. These apertures are used for pressure equalisation so that introduced pressure can freely move between the profile plate panels 121 and 122, in particular can propagate without hindrance from the framework structure of the stay plates 331a or 331b.

Basically, on the one hand the framework structure shown in FIG. 17 provides the possibility of achieving improved mechanical stability of the stay plates 331a or 331b and thus of the hollow chamber profile or of the profile plate portion 120, and, on the other hand, the stay structure, shown in FIG. 1, of the reinforcing elements 30 provides the possibility of achieving an embodiment of reduced weight. FIGS. 13 and 14 show a metal mesh arrangement 140 in more detail. In this arrangement any desired types of fabric weave can be used, for example regular or irregular twill fabrics. Thus, a cross section of the embodiment according to FIG. 14 shows that the individual mesh wires, and in particular metal wires 144, extend in different planes, but not exclusively within these planes. Instead, the metal wires 144 essentially extend in an undulating manner and in each case so as to be offset from each other at an angle of 90°. This results in a mesh as shown, for example, in FIG. 13 in an isometric view. The individual metal wires 144 alternatingly extend over each other and under each other, and in this manner mesh to form a mechanically stable metal mesh arrangement 142.

The outer or first profile plate panel 121 is designed so as to be permeable to fluid. For this purpose the permeability can be achieved by the realization of the profile plate panel 121 as mesh arrangement 140 and in this case by the distances which exist in the mesh between the single wires or metal wires 144 and the holes resulting therefrom. Depending on the density of the mesh and the distance between the individual wires 144, in this manner greater or lesser mechanical stability and also greater or lesser permeability can be set.

In this arrangement the metal mesh arrangement 140 per se is, in other words the individual metal wires 144 among themselves are, connected by diffusion welding. Thus the individual layers of the metal mesh arrangement per se, and also the individual layers of the metal mesh arrangement among themselves, are interconnected by way of diffusion welding. As a result of the use of the diffusion welding method, in this arrangement connections between the metal wires 144 are established that on the one hand are particularly durable, and on the other hand are also particularly simple, in other words economical, to manufacture. In this arrangement the diffusion welding process is carried out in a tool 80 (not shown in FIGS. 13 and 14) at approx. 1000° C. and ranging between 10 bar and 85 bar, in particular between 20 bar and 60 bar, for the duration of several hours, for example 3 hours. In principle a host of different mesh structures are imaginable. For example, it is possible for the individual metal wires 44 to extend relative to each other so as to be offset by approx. 90 degrees, as shown in FIGS. 13 and 14, with said metal wires 44 alternatingly extending over and under each other. Thus, by way of a multitude of contact points of the individual metal wires great mechanical stability is created and at the same time by means of the spaces between the contact points and the metal wires 144 adequate apertures are created that result in the desired permeability of the outer profile plate panel 121.

Figure 41A:
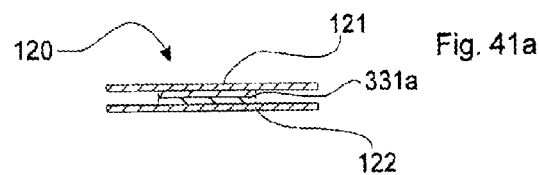
FIG. 41a a cross section of a first method-related step, in which the supporting stays are located between the panels with their legs folded together.

FIG. 41a shows one embodiment of a tool 80 used for connecting the profile plate panels 121 and 122 to the reinforcing elements 30. In addition, by means of the tool components W1, W2 it is also possible, in a forming process, in particular by means of superplastic deformation, to carry out a change in the position of the supporting stay components. This forming process will be described later with reference to FIGS. 41a to 41d and 42a to 42c. After arranging, according to the invention, the individual profile plate panels 121 and 122 as well as the stay plates 331a or 331b situated in between, the tool components W1, W2 are moved together and the tool formed by these is closed. In this arrangement it can be provided that the bottom cover plate rests on or against the bottom tool component W1 only in subregions. These subregions support the bottom profile plate panel 122 or all the components arranged thereon of the hollow chamber profile or profile plate portion 120 until commencement of the step of connecting the profile plate panels 121 and 122 to the stay plates 331a or 331b.

The tool is designed in such a manner that hot air can be blown into the space between the tool components W1, W2. By blowing in the air at an adequate temperature and an adequate pressure, the tool halves are pushed apart. The relatively high temperature of the air also causes the joints 33a, 34, 35a or 35b that have been made by diffusion welding to cause maintenance of the joints between stay plates 331a or 331b and profile plate panels 121 or 122.

According to one embodiment the space between the bottom tool shape W1 and the bottom profile plate panel 122 can be designed in such a manner that in that location an interior pressure can be applied in order to be able to fix the second profile plate panel 122 to the tool component W1. As an alternative or in addition, it is also possible to provide mounting means for fixing the second profile plate panel 122 to the tool component W1.

Furthermore, pressure channels (not shown in the figures) are provided in the tool W1, W2, by way of which pressure channels gas for generating the interior pressure can be pumped and blown into this space. As a result of this internal pressure, force is exerted on the inner profile plate panel 122 that extends through the entire profile plate portion 120 and rests against the top tool component W2. Thus, as a result of the interior pressure, the profile plate panels 121, 122 are pressed against the top tool component W2 and at the same time are pressed against each other. At an interior pressure ranging between 10 and 85 bar, in particular between 20 and 60 bar, with the profile plate portion 120 being heated up to 1000° C., in this method-related step in approx. 3 hours the connections between the reinforcing elements or stay plates 331a or 331b and the profile plate panels 121 and 122 are established by means of diffusion welding.

In the method according to the invention it is provided that the tool component W2 that rests against the first profile plate panel 121 comprises an air exhaust device by means of which, during the interior pressure built up for expanding the space between the profile plate panels 121, 122 and the tool components W1, W2 in the tool, greater air throughput during removal of air through the first tool component W1 from the region between the two tool components W1, W2 is provided than the air throughput that flows through the first profile plate panel 121.

Each of FIGS. 41a to 41d shows in detail the arrangement of a section of the profile plate panel 122 and of the top profile plate panel 121 with an arrangement comprising two stay plate components 31, 32 that form a stay plate 331a in the state resting on one another. Accordingly, the stay plate can also comprise more than two stay plate components if the aforesaid are correspondingly interconnected by means of diffusion welding. The subsequent deformation steps result in plastic or superplastic deformation of the arrangement and in particular of the weld joints between the respective stay plate components 31, 32 and between a stay plate component 31, 32 and the respective profile plate panel 121 or 122 to which in each case a stay plate component 31, 32 is connected. By the multiple implementation of stay plates with the use of stay plate components, hingeing open or raising stay plate components correspondingly placed on one another is possible if corresponding welded connections are provided.

Figure 41B:
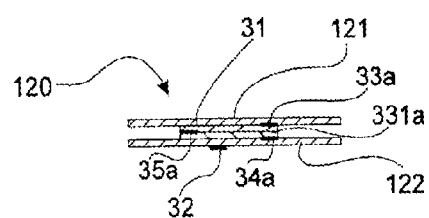
FIG. 41b a cross section of a further method-related step, in which the supporting stays have been diffusion-welded to the panels.
Figure 41C:
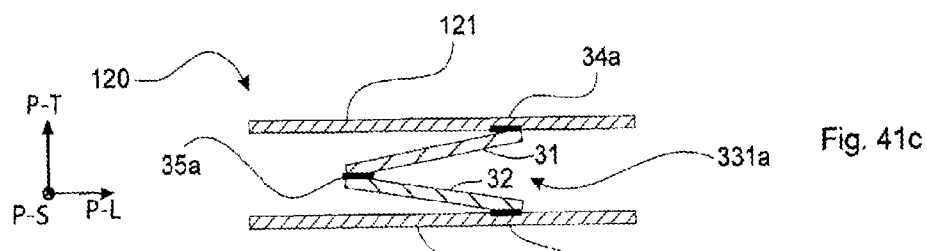
FIG. 41c a cross section of a further method-related step, in which the legs of the supporting stays have been moved apart half-way.
Figure 41D:
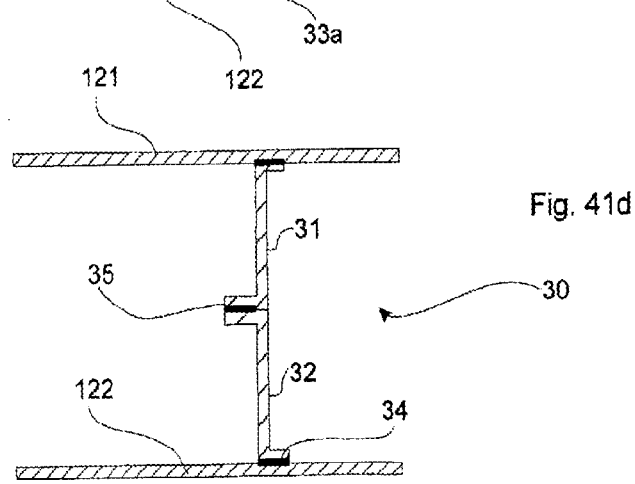
FIG. 41d a cross section of a further method-related step, in which the legs of the supporting stays have been moved apart entirely.

FIGS. 41b and 42c show the result of connecting, for example by means of diffusion welding, to a tool according to FIGS. 40a to 40d. FIGS. 41b and 42c show the joints 35 that have formed by connecting stay plates 331b or stay plate components 31, 32 to each other or by connecting the aforesaid to profile plate panels 121 and 122.

According to the invention, in a single step of diffusion welding, not only is the connection between the profile plate panels 121 or 122 and stay plates 331b or stay plate components 31, 32 to each other or the connection of the aforesaid to profile plate panels 121 and 122 established, but, in particular, the individual stay plates 331b or stay plate components 31, 32 are interconnected. In order to ensure that in this process, in particular with the application of a diffusion welding method, welded connections, in other words joints 33, 34, 35 or 35b, arise exclusively at the positions mentioned, a so-called stop-off coating is provided between individual components, in other words between the remaining regions of the profile plate panels 121 or 122 and of the stay plates 331b or stay plate components 31, 32, which stop-off coating prevents connecting, in particular welding, the respective component to undesirable positions. This coating thus acts as a separating means, thus preventing the creation of undesirable joints.

FIG. 41d shows the result of a diffusion welding step in the method for manufacturing a hollow chamber profile 10 with a framework structure for the reinforcing elements 30, as shown in FIG. 2. In contrast to the stay structure shown in FIGS. 41b and 41c, in FIG. 41d only a central layer is provided as a reinforcing element 41d. Said reinforcing element 41d is connected to the cover plates, for example with the use of a stop-off-coating, as shown in FIG. 41d. In a subsequent forming process, for example by means of superplastic deformation as explained in the context of FIGS. 42c and 42d, the final shape of the framework structure of the strengthening elements 30 is generated.

FIGS. 41c and 41d or 42b and 42c show the forming step that follows connecting the profile plate panels 121 or 122 and stay plates 331b or stay plate components 31, 32 to each other, and connecting the aforesaid to profile plate panels 121 and 122. Advantageously, this step also takes place in the tool W1, W2. In this step, the geometric characteristics of the bottom tool shape W1 comes into play. In this arrangement the bottom tool shape W1 has the negative geometric characteristics of the positive geometric shape of the bottom profile plate panel 122, which positive geometric shape will be the final shape after the manufacturing process. The tool with the bottom tool shape W1 is designed in such a manner that the region between the bottom tool shape W1 and the bottom profile plate panel 122 can be pressurised. Thus the bottom tool W1 quasi provides a negative shape for the bottom profile plate panel 122 and thus a negative shape for the bottom of the profile plate portion 120.

Figure 42A:
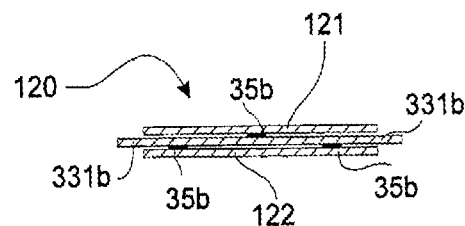
FIG. 42a a cross section of a first method-related step, in which a further embodiment of the supporting stays is shown, wherein the legs of said supporting stays are situated between the panels so as to be folded together.
Figure 42B:
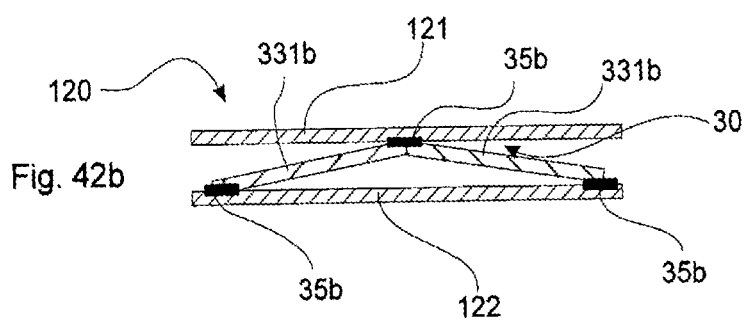
FIG. 42b a cross section of a further method-related step, in which the legs of the supporting stays have been moved apart half-way.
Figure 42C:
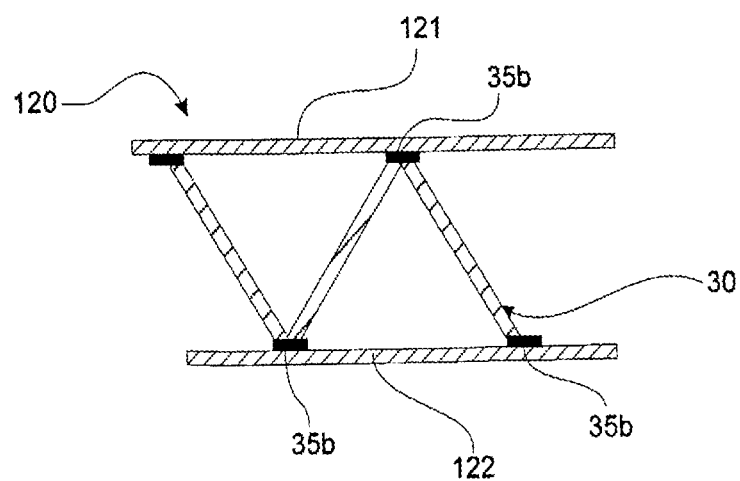
FIG. 42c a cross section of a further method-related step, in which the legs of the supporting stays have been moved apart entirely.

In order to now obtain the final geometric characteristics of the hollow chamber profile 10 in the manner shown in FIG. 42b, it is necessary, from a starting point that is, for example, shown in FIG. 41b or 42a, for the profile plate portion 120 to be moved apart, in other words raised. This moving apart, in particular by means of superplastic deformation, can take place in two different ways. One of the two variants involves the use of the space between the bottom tool shape W1 and the bottom profile plate panel 122 to generate a vacuum. Because of the lack of a possibility for pressure equalisation, such a vacuum sucks the bottom profile plate panel 122 in the direction of the bottom tool shape W1. In this arrangement, both the bottom profile plate panel 122, which obtains the geometric characteristics of the shape of the bottom tool shape W1, and the reinforcing elements 30, which fold apart between the two profile plate panels 121 and 122 or which "arise". In order to ensure that the top profile plate panel 121 remains in close contact with the top tool W2, advantageously affixation can be provided to hold the top cover plate 40 in the desired position. Such affixation can, for example, take place mechanically in the form of hooks or positive-locking elements or by reversible connections such as spot welding, bonding or spot soldering. The state shown in FIG. 42a is an intermediate state between commencement of the erection process as shown in FIG. 41c, and the end of the erection process, as shown in FIG. 42b.

As an alternative or in addition, it is, in particular, provided that the second tool component W2, which rests against the first profile plate panel 121, comprises an air exhaust device, by means of which at the interior pressure built up in the tool, for expansion of the space of the profile plate panels 121, 122 with the tool components W1, W2 a greater air throughput during the removal of air through the second tool component W2 from the region between the two tool components W1, W2 is provided than the throughput of air that flows through the first profile plate panel 121. The air exhaust device can, in particular, be formed by at least one channel in the tool component W2, which channel opens to the tool component surface and at the end opposite the aforesaid makes it possible for the air flowing from the space between the tools W1, W2 to escape. In this arrangement this channel can also be connected to a negative pressure pump.

The invention claimed is:

1. A profile plate portion comprising:
   at least in some sections, a first profile plate panel against which during use of the profile plate portion a flow is present, wherein the first profile plate panel is permeable to fluid in such a manner that in some sections the fluid flows through the profile plate panel;
   a second profile plate panel, which, at least in some sections, extends along the first profile plate panel and is directly spaced apart from the first profile plate panel in a local profile plate thickness direction; and
   a reinforcing device for supporting the first profile plate panel and the second profile plate panel on one another, wherein the reinforcing device is formed from an open-pore metal foam layer that extends between the first profile plate panel and the second profile plate panel;
   wherein the open-pore metal foam layer comprises a corrosion-resistant material;
   wherein the open-pore metal foam layer on a side of the second profile plate panel comprises recesses defining regions devoid of the open-pore metal foam layer that open towards the second profile plate panel and each merge with apertures of the second profile plate panel;
   wherein fluid of the flow present at the first profile plate panel, which fluid flows through the first profile plate panel, flows along a longitudinal direction of the first profile plate panel through the reinforcing device and between the first profile plate panel and the second profile plate panel; and wherein the recesses comprise a delimitation area to the open-pore metal foam layer such that an active suction-extraction cross section between the recesses and the open-pore metal foam layer increases to be approximately at least 1.5 times as large as an aperture cross section of the apertures of the second profile plate panel.

2. The profile plate portion according to claim 1, wherein supporting carriers extend in a spanwise direction of the profile plate portion, the supporting carriers being attached to the first and second profile plate panels, wherein, at least in some spaces which in each case form between two adjacent supporting carriers, at least one open-pore metal foam layer body is received such that fluid flowing through the first profile plate panel flows through the open-pore metal foam layer body.

3. The profile plate portion according to claim 2, wherein the at least one open-pore metal foam layer body rests flat against respective supporting carriers, between which in each case a metal foam layer body is situated.

4. The profile plate portion according to claim 1, wherein the recesses are at least in part spherical in shape when viewed in profile section.

5. The profile plate portion according to claim 1, wherein, for a purpose of supporting the open-pore metal foam layer, the recesses comprise a strengthening layer that is permeable to fluid.

6. The profile plate portion according to claim 1, wherein, for a purpose of forming a hollow chamber profile, the reinforcing device comprises supporting stays connected to the first and second profile plate panels, wherein the supporting stays mutually support the first and second profile plate panels in the local profile plate thickness direction, and wherein the supporting stays delimit fluid chambers through which the fluid flowing through the first profile plate panel flows to the second profile plate panel.

7. The profile plate portion according to claim 6, wherein, at least in some sections, supporting stays extend across a longitudinal direction of the profile plate portion along each other, wherein supporting stays in a cross-sectional plane that extends along the longitudinal direction of the profile plate portion are curved or are formed from wall sections that extend at an angle to each other and that adjoin each other.

8. The profile plate portion according to claim 6, wherein the supporting stays are wall sections that form profile plate chambers.

9. The profile plate portion according to claim 6, wherein the first profile plate panel comprises micro perforations whose distribution density and/or size in each case increases in a region within a profile plate chamber in a longitudinal direction of the profile plate portion.

10. The profile plate portion according to claim 6, wherein wall sections in a cross-sectional plane that extends along the longitudinal direction of the profile plate portion form a polygonal, in particular, honeycomb-shaped, cross-sectional area of profile plate chambers.

11. The profile plate portion according to claim 6, wherein cross-sectional planes of the supporting stays that are defined by the thickness direction and by the longitudinal direction form a framework structure.

12. The profile plate portion according to claim 6, wherein at least some of the supporting stays comprise apertures for fluid flow between the fluid chambers delimited by the supporting stays.

13. The profile plate portion according to claim 1, wherein the first profile plate panel comprises a mesh arrangement.

14. The profile plate portion according to claim 1, wherein the first profile plate panel comprises apertures in a form of perforations that are distributed in a longitudinal direction of the profile plate portion and in a cross direction of the profile plate portion over a distance of the first profile plate panel.

15. The profile plate portion according to claim 1, wherein the first profile plate panel comprises apertures that are distributed in a longitudinal direction of the profile plate portion and in a cross direction of the profile plate portion over a distance of the first profile plate panel.

16. The profile plate portion according to claim 1, wherein a size of apertures of at least some fluid chambers within a region increases in a longitudinal direction of the profile plate portion.

* * * * *